United States Patent [19]

Davis

[11] Patent Number: 5,625,555

[45] Date of Patent: *Apr. 29, 1997

[54] DATA COMMUNICATION SYSTEM WITH ADAPTER FOR REMOVABLE COUPLING OF PORTABLE DATA TERMINALS

[75] Inventor: Patrick H. Davis, Cedar Rapids, Iowa

[73] Assignee: Norand Corporation, Cedar Rapids, Iowa

[ * ] Notice: The term of this patent shall not extend beyond the expiration date of Pat. No. 5,457,629.

[21] Appl. No.: 423,385

[22] Filed: Apr. 14, 1995

Related U.S. Application Data

[63] Continuation of Ser. No. 25,308, Mar. 2, 1993, abandoned, which is a continuation-in-part of Ser. No. 305,302, Jan. 31, 1989, abandoned, and a continuation-in-part of Ser. No. 948,034, Sep. 21, 1992, abandoned, which is a continuation of Ser. No. 347,602, May 3, 1989, abandoned, which is a continuation-in-part of Ser. No. 327,660, May 23, 1989, abandoned.

[51] Int. Cl.⁶ .................................................. G06F 13/00
[52] U.S. Cl. .................................... 364/423.098; 235/375
[58] Field of Search ................... 364/424.01, 424.05, 364/709.12; 235/375, 472; 429/7, 99; 439/377, 929

[56] References Cited

U.S. PATENT DOCUMENTS 3,796,984   3/1974   Selinko .................................. 339/88 R
4,558,270   12/1985  Liautaud et al. ......................... 320/2
4,773,032   9/1988   Uehara et al. ........................ 364/704.04
4,835,372   5/1989   Gombrich et al. ...................... 235/375

OTHER PUBLICATIONS

Brochure Entitled "4000 Series Communications Network"; Norand Corp.; Copyright 1992.

*Primary Examiner*—Michael Zanelli
*Attorney, Agent, or Firm*—McAndrews, Held & Malloy, Ltd.; R. Lewis Gable

[57] ABSTRACT

A vehicle for transport, fork lift or delivery route operations, for example, includes on-board peripherals which are coupled through a Local Area Network (LAN) into a data system. A LAN data bus provides selective access to the peripherals or data devices such as, for example, a large area display, a keyboard, a printer and a data terminal. The data system controls or provides data on tasks executed by or in connection with the operation of the vehicle. To increase the versatility of the vehicle, the data terminal, multiple data terminals, or any of the other data devices may be removably coupled to the LAN to be operable externally of the vehicle. A mobile mount adapter provides a secure electrical connection of a respective data terminal to the LAN to removably incorporate the data terminal into the data system. The data terminal includes base contact areas which are contacted by spring contacts of the adapter. An "open face" of a disclosed adapter allows a cable for a scanner or other data link to extend from adjacent the base contact areas without a need to remove the extending cable, thereby enabling a cable-connected scanner to be moved and used while the data terminal is disposed in the adapter.

44 Claims, 10 Drawing Sheets

DATA COMMUNICATION SYSTEM WITH ADAPTER FOR REMOVABLE COUPLING OF PORTABLE DATA TERMINALS

SPECIFICATION AUTHORIZATION PURSUANT TO 37 CFR 1.71 (d) and (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATION

This is a continuation of application Ser. No. 08/025,308 filed on Mar. 2, 1993, now abandoned, which is a continuation-in-part of application U.S. Ser. No. 07/305,302 filed Jan. 31, 1989 now abandoned.

The present application is also a continuation-in-part of Patrick H. Davis et al application U.S. Ser. No. 07/948,034 filed Sep. 21, 1992, abandoned, which is a continuation of earlier application U.S. Ser. No. 07/347,602 filed May 3, 1989, abandoned which in turn is a continuation-in-part of Patrick H. Davis application U.S. Ser. No. 07/327,660 filed May 23, 1989, abandoned.

The content of the Davis application U.S. Ser. No. 07/327,660 is found in Patrick H. Davis U.S. Pat. No. 5,052,943 issued Oct. 1, 1991 which is based on U.S. Ser. No. 551,663 filed Jul. 10, 1990 as a continuation of Ser. No. 07/327,660, and said Davis U.S. Pat. No. 5,052,943 is hereby incorporated herein by reference in its entirety.

BACKGROUND OF THE INVENTION

This invention relates to a vehicle data system wherein a multiplicity of devices, such as two-way radio data transceivers, bar code scanners, RF tag readers, large format keyboards and displays, printers, electronic scales and other types of measuring devices, may be associated on board an individual delivery route vehicle, material handling vehicle, or the like.

Factory and warehouse material handling can take many forms. The simplest operations may involve individuals manually carrying goods from one point to another. As materials get larger and more material is moved, carts or lift trucks are typically used. Highly automated operations may use computer controlled storage and retrieval systems with complex systems of conveyors, elevators and handling equipment. Whether the system is automated or not, most material handling operations utilize human operated lift trucks of some type. The non-automated operations generally require the lift truck operator to get written instructions from a foreman or supervisor and then begin moving product per those instructions. More automated operations have often used two-way mobile radio communications to give instructions to operators in real time.

Shipping and distribution operations generally involve loading trucks with the correct materials or products, sending them to the correct destinations at the correct time, and unloading them in the correct order. Error or inefficiency in any of these operations may cause loss of time, revenue and ultimately profit. In recent years, the formerly manual methods of directing these processes have been replaced by computer supported techniques including computerized order entry and shipping instruction, route accounting on delivery vehicles, and direct store delivery of products, while most large operations utilize central computer systems to automate many of these processes, the use of computer data terminals on the vehicle is expanding to provide better operator productivity, information control and customer service.

In connection with the use of portable data systems on board such vehicles, it is conceived that it would be highly advantageous to be able to readily expand the number and types of on-board peripherals. The ability to easily add peripherals, such as bar code scanners, RF tag readers, large format displays and keyboards, printers, electronic scales and other types of measuring devices, offers further improvements in accuracy and efficiency. The ability to monitor critical vehicle performance parameters such as fuel economy, engine temperature and oil pressure, odometer and tachometer readings and the like offer the capability to manage and optimize the efficiency of a fleet of vehicles. The most effective application of these system components would result if all of the parts could be integrated into the system in an organized, logical fashion.

An important feature would be the ability to quickly and conveniently disconnect a selected portable device from any non-portable components and operate the same in a portable mode when needed. One exemplary application of radio data terminals involves reading bar coded labels on items or materials that are not accessible by a vehicle. Another situation where portability is advantageous is in reading labels on all four sides of a shipping pallet with individual packing containers placed such that the bar coded labels are arranged on the outside surface of the "stack". It would be much more convenient for an operator to read all the associated labels by walking around the stack than to maneuver the vehicle around the pallet to read all the labels. Consequently, the radio terminal mounting system should ideally be configured so that the operator can easily remove the terminal from its mobile mount with its scanner attached, use the terminal portably, and return it to the mobile mount with minimal effort or care. Similarly, a route accounting terminal is removed from its vehicle mount regularly to be hand carried by the operator to the point where data is to be captured.

SUMMARY OF THE INVENTION

Accordingly, it is an important object of the present invention to provide a vehicle data system wherein components can be readily detached for portable operation and wherein various peripheral devices can be readily accommodated.

A further object resides in the provision of such a vehicle data system wherein multiple devices may be connected at different locations in different vehicles and integrated into a vehicle data communication system on a dynamic basis without interrupting system operation.

In a presently preferred configuration particularly suited for forklift truck applications and the like, a portable data terminal and a set of peripheral devices are connected via a vehicle local area network (LAN) having the following characteristics:

(1) The LAN is configured so that multiple devices may be connected simultaneously.
(2) The LAN provides reliable two-way data communication.
(3) The LAN may have a total length up to hundreds of feet for operation on virtually any vehicle.

(4) Any connected device may be inactive or off without having an effect on the other devices.

Power for operation of the portable data terminal is provided by the internal terminal batteries when used portably and by the vehicle when the terminal is placed in the vehicle mount. Further, the terminal batteries may receive charge while the terminal is operating from the vehicle power so that full battery capacity is available when portable operation is required.

In accordance with a further development of the invention, portable terminals, for example, may be quickly removed from the system, and may be placed in generally random physical network locations by the terminal users.

It is a feature of the invention to provide a network capable of assigning suitable identification to a newly added terminal or the like on a dynamic basis (without requiring each device to have its own unique "hard" address, and without interruption of system operation).

Other objects, features and advantages will be apparent from the following detailed description, taken in connection with the accompanying drawings, and from the individual features and relationships of the appended claims.

BRIEF DESCRIPTION OF THE DRAWING FIGURES

Figure 3:
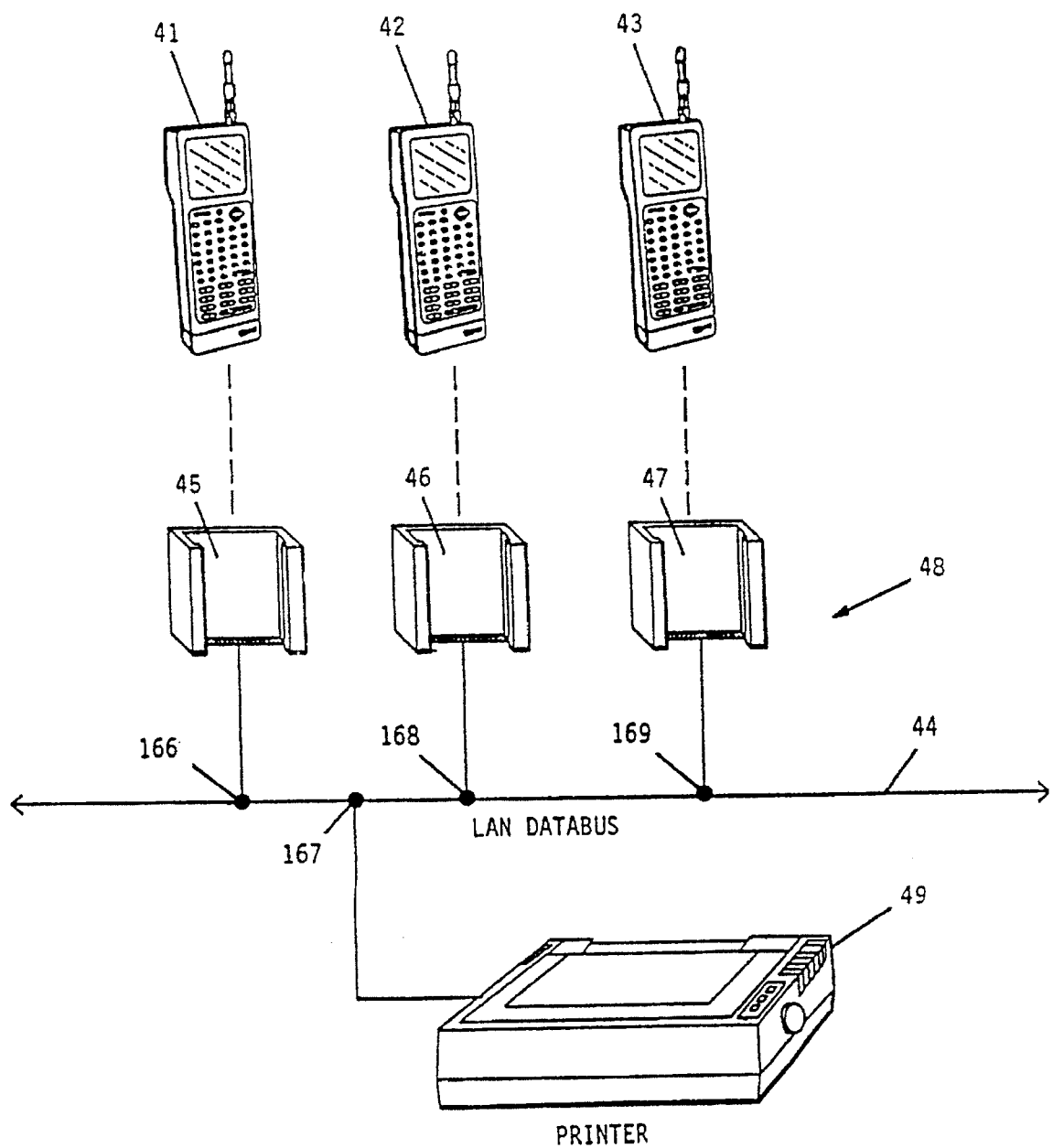
FIG. 3 shows a vehicle data system which may include the features and components of FIG. 1, and which further provides for plural terminals sharing a common peripheral device means such as a printer.
Figure 4:
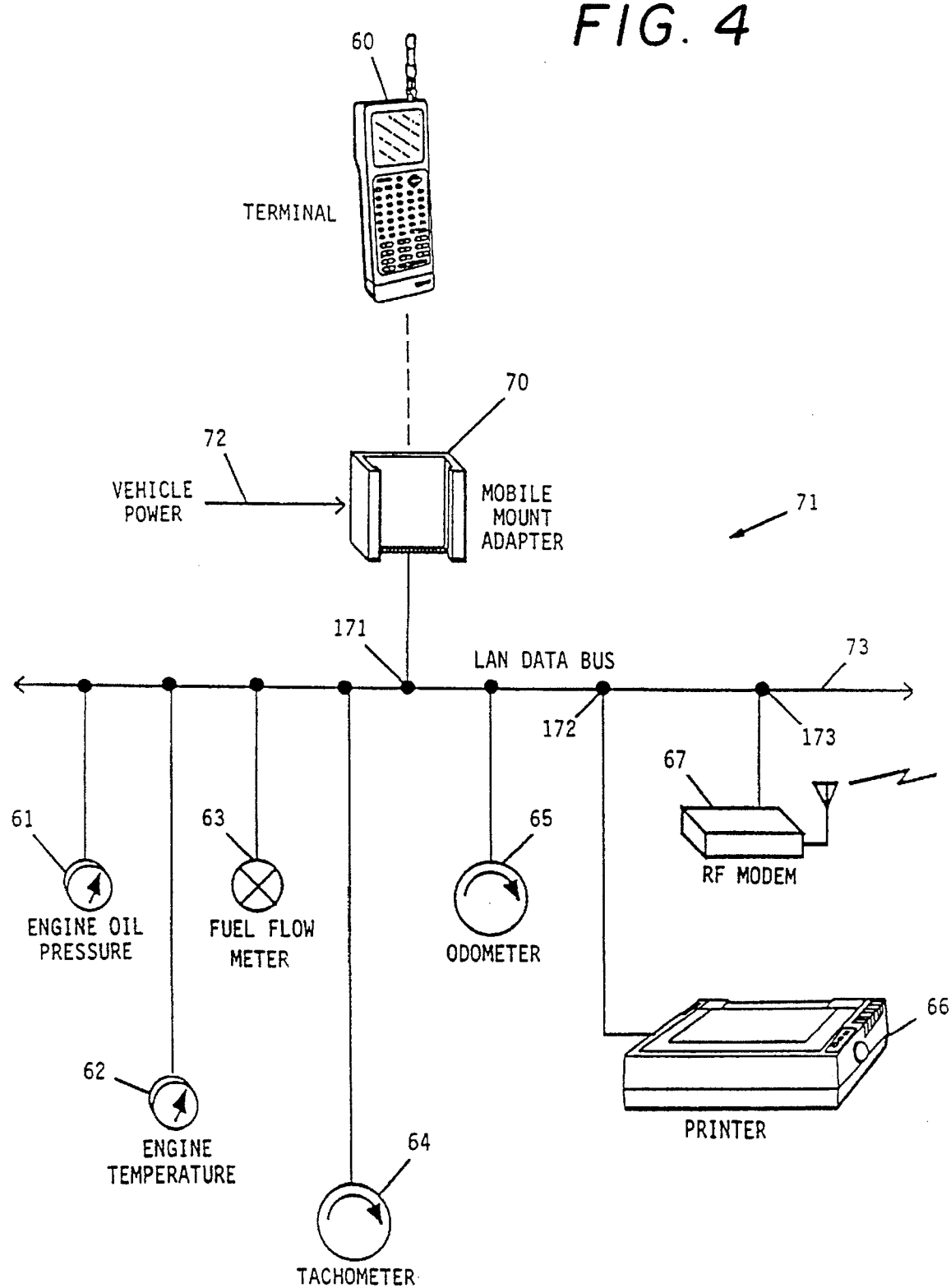
FIG. 4 shows a further vehicle data system in accordance with the present invention, which is particularly appropriate for product distribution applications and the like, features of FIG. 3 also being applicable to FIG. 4, and the RF link for example of FIG. 4 also being applicable to FIGS. 1–3.
Figure 5:
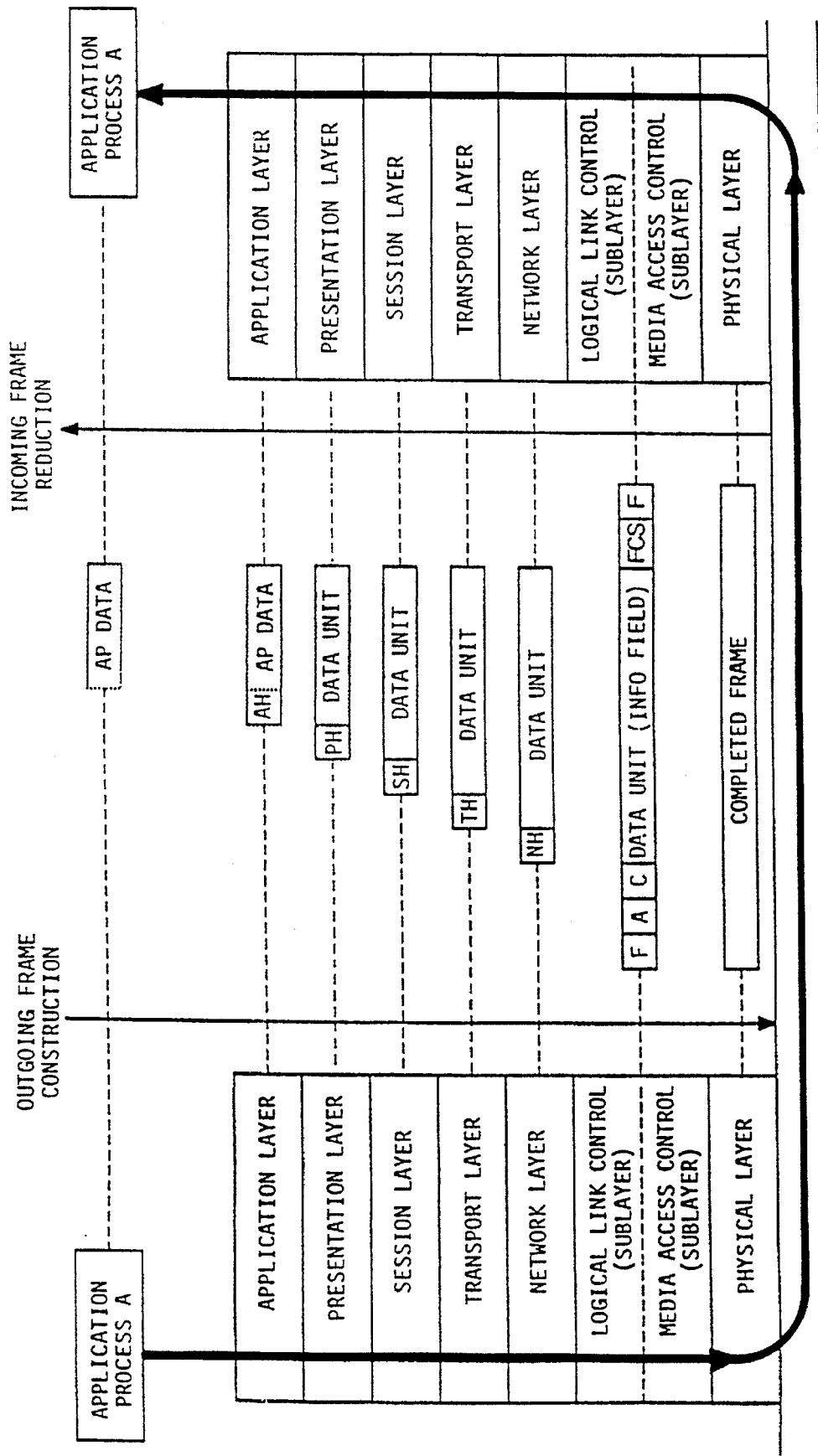

FIG. 5 is a diagram illustrating the various data processing layers of a preferred implementation of local area network and representing message frame construction for an outgoing transmission at the left and the inverse incoming frame reduction at the right, exemplary frame formats for the respective layers being represented centrally of the diagram, and an exemplary physical transmission link being indicated as a horizontal path at the bottom of the diagram (and corresponding to the LAN data bus transmission paths of FIGS. 1–4).

Figure 6:
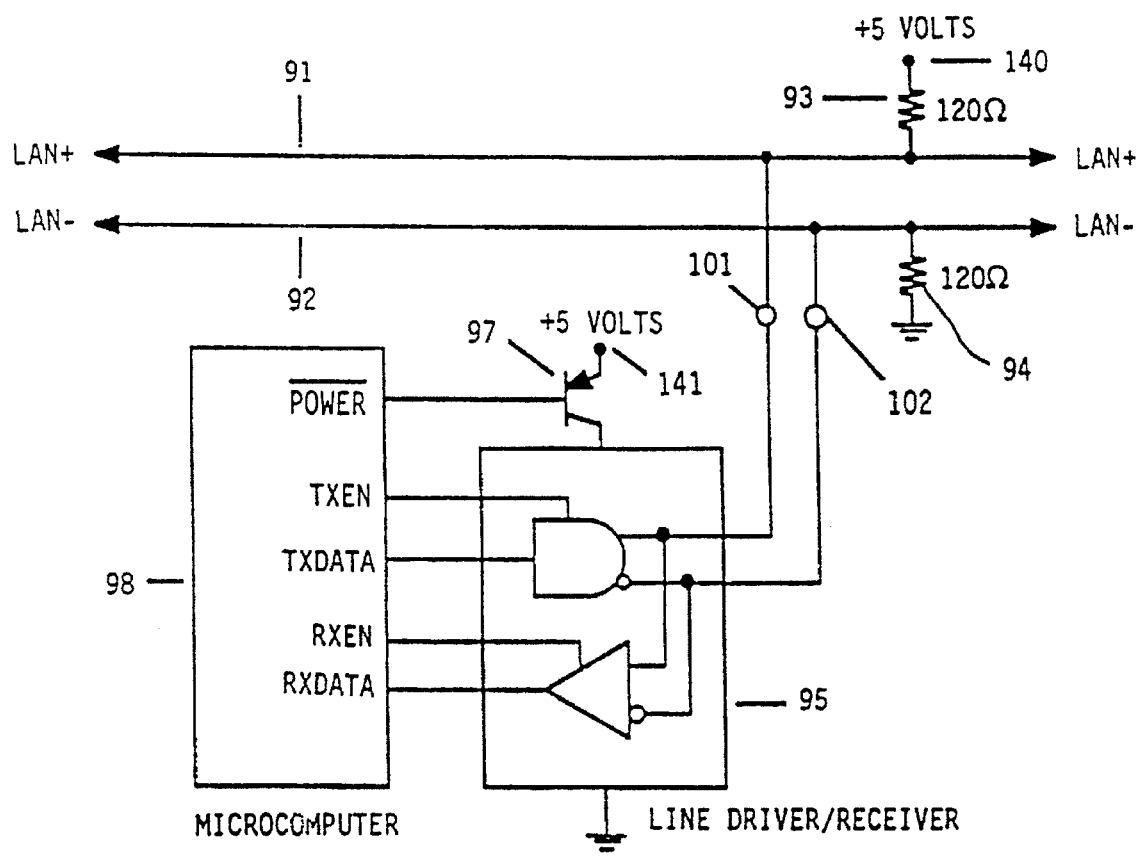

FIG. 6 shows a preferred electrical interface arrangement for coupling each of the terminals and peripheral devices of FIGS. 1–4 with the LAN transmission link of these Figures. The illustrated electrical interface of FIG. 6 is an example of a "Physical layer" as diagrammed in FIG. 5.

Figure 1:
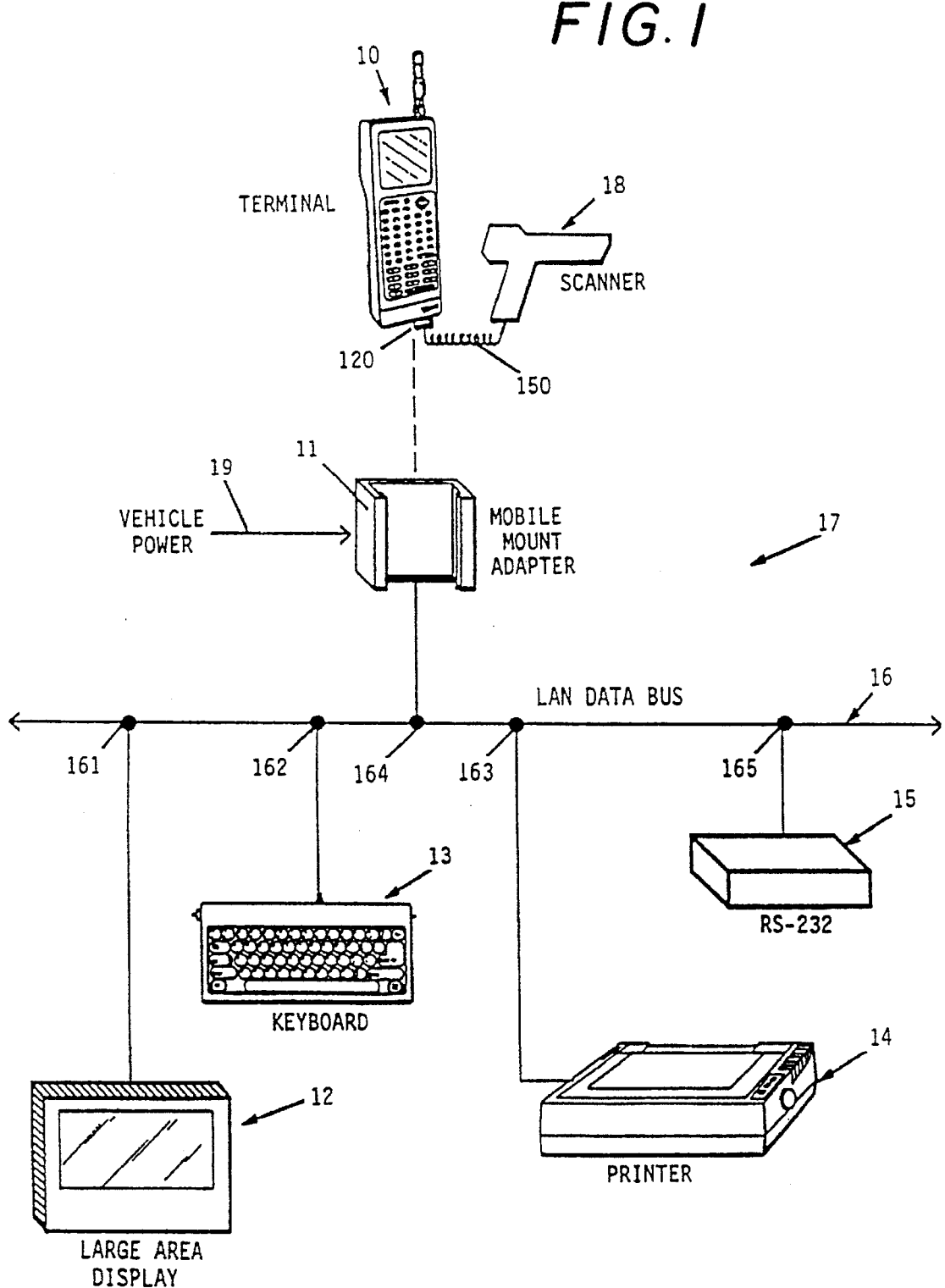
FIG. 1 is a diagrammatic illustration of a vehicle data system in accordance with the present invention, and which may represent a data system associated with a gasoline-powered or battery-powered material handling vehicle such as a forklift truck.
Figure 7:
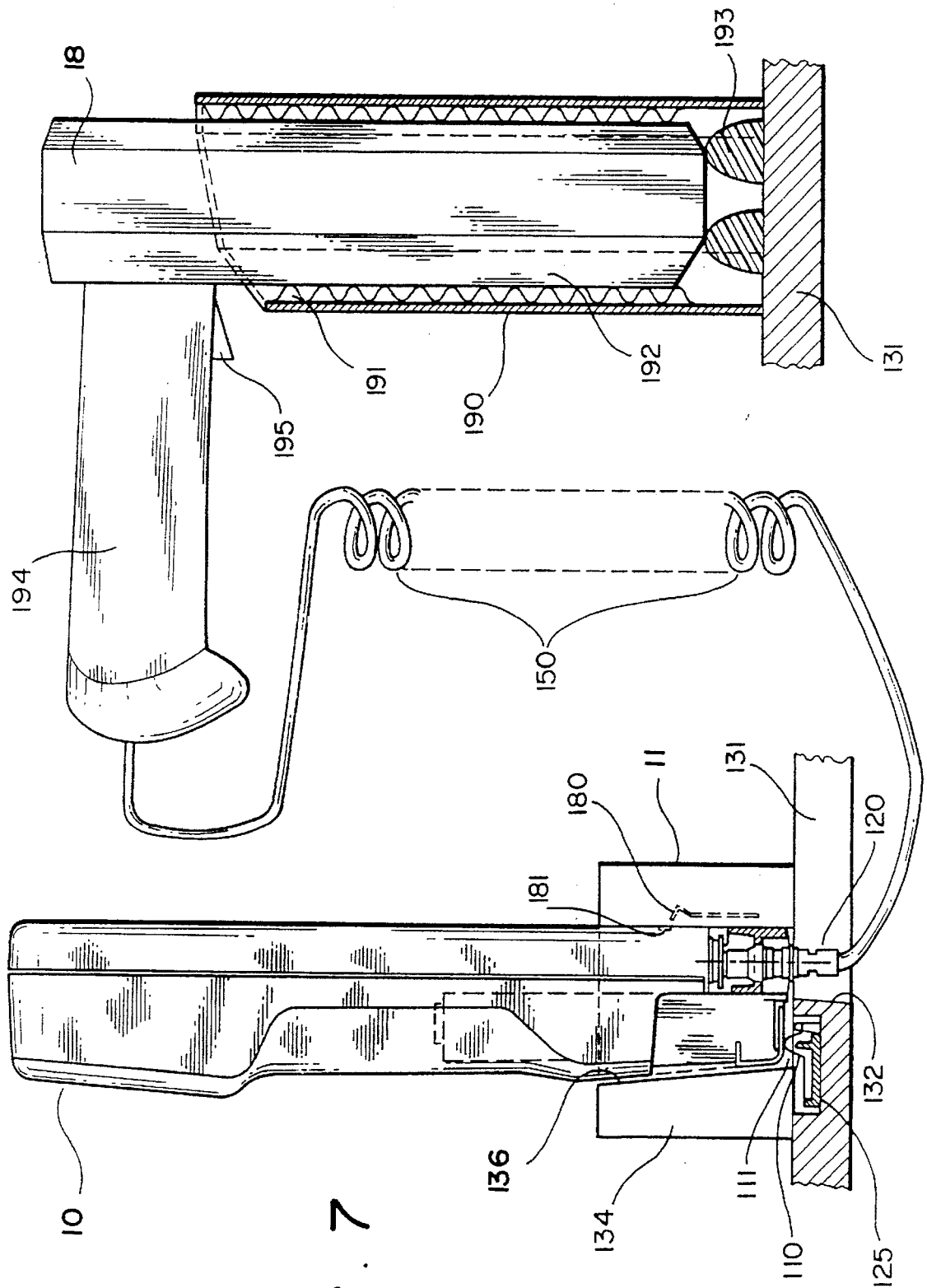

FIG. 7 is a somewhat diagrammatic partial vertical sectional view illustrating constructional details of a preferred adapter for the systems of FIGS. 1–4, a portable battery powered terminal corresponding to that of FIG. 1 being shown as being inserted part way into the adapter channel, to the point of initial electrical contact; and also indicating in diagrammatic fashion a laser bar code scanner device in a separate vehicle mounting or holster means and coupled with the terminal via an extendable coiled cable.

Figure 8:
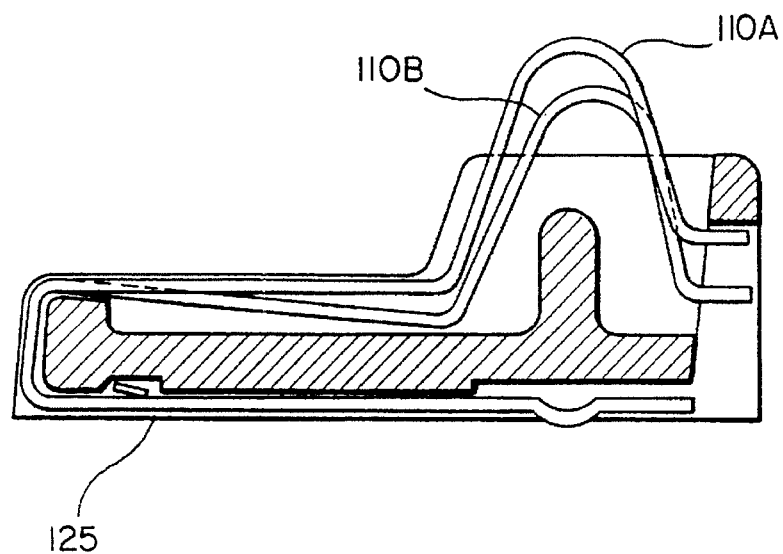

FIG. 8 is a somewhat diagrammatic longitudinal sectional view showing the adapter contact assembly of FIG. 7 on a greatly enlarged scale.

Figure 9:
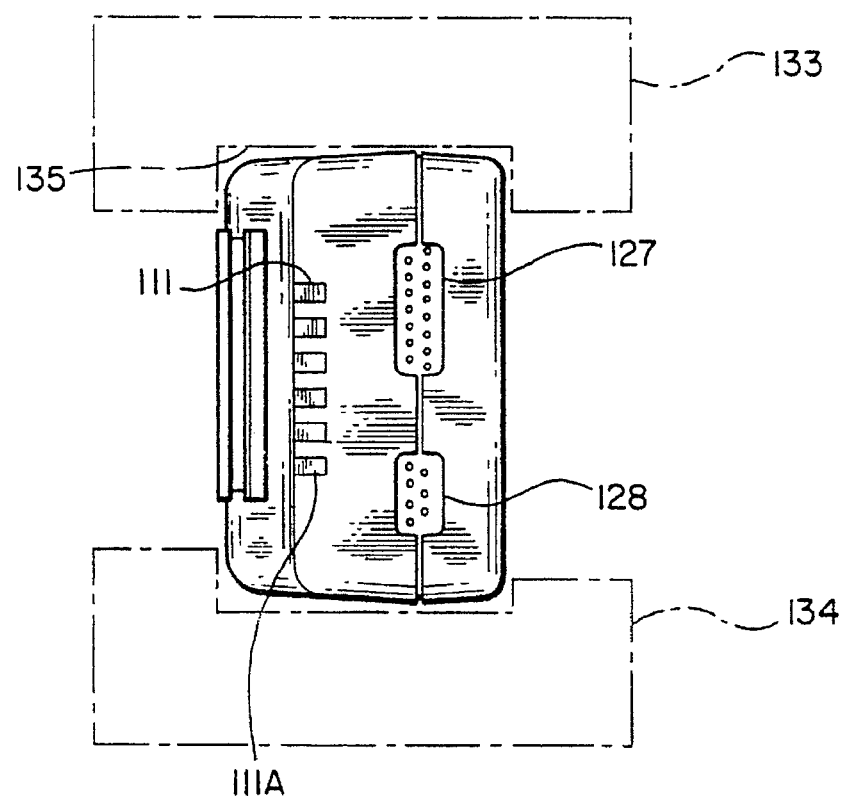

FIG. 9 is a diagrammatic bottom plan view of the terminal of FIGS. 1 and 7, illustrating the external contact area of the terminal and also the connector fittings for coupling the terminal with a scanner such as the handheld laser bar code scanner which is diagrammatically indicated in FIGS. 1 and 7.

Figure 10:
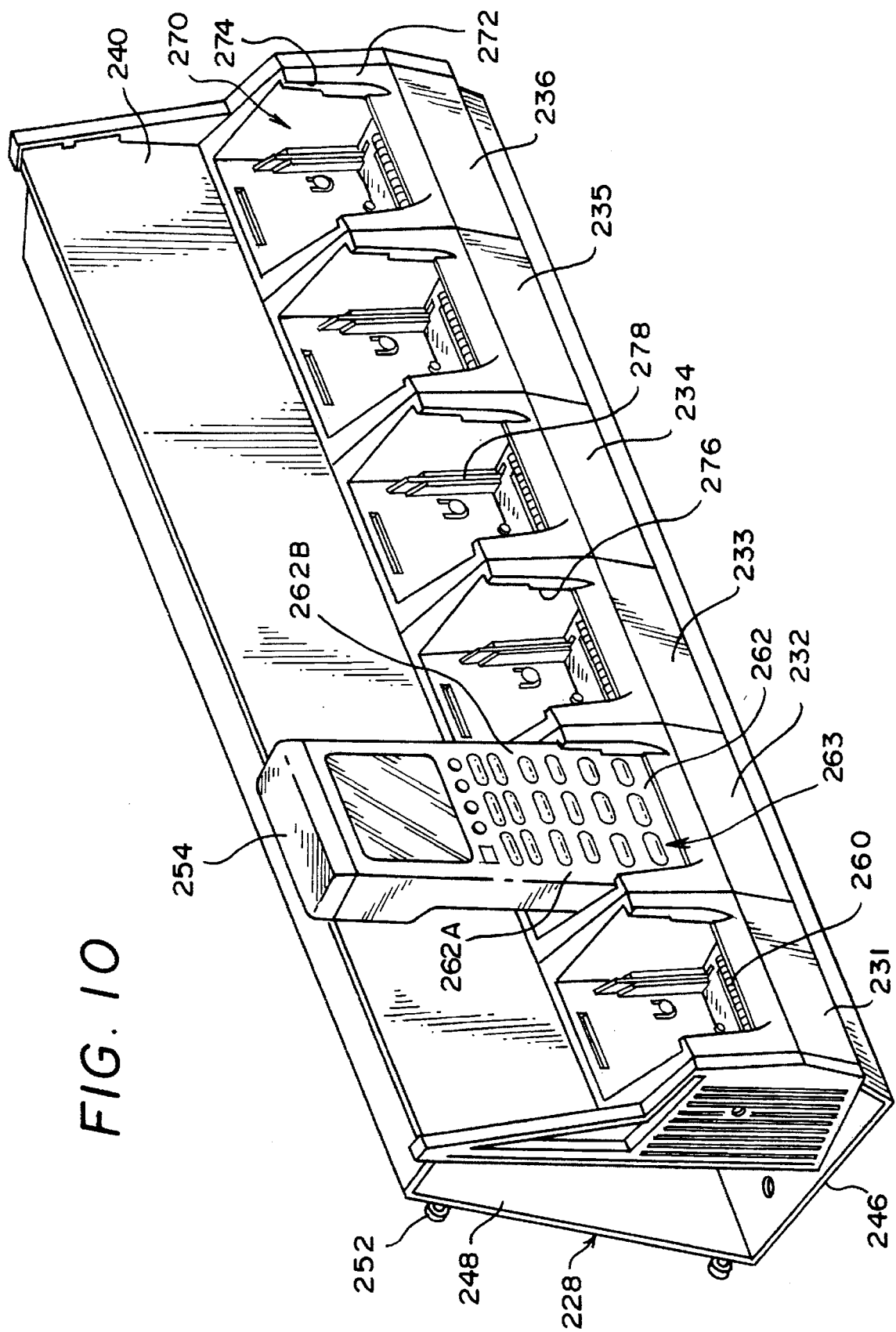

FIG. 10 is a perspective view showing a series of adapters arranged in side by side relationship to form a fixed installation.

Figure 11A:
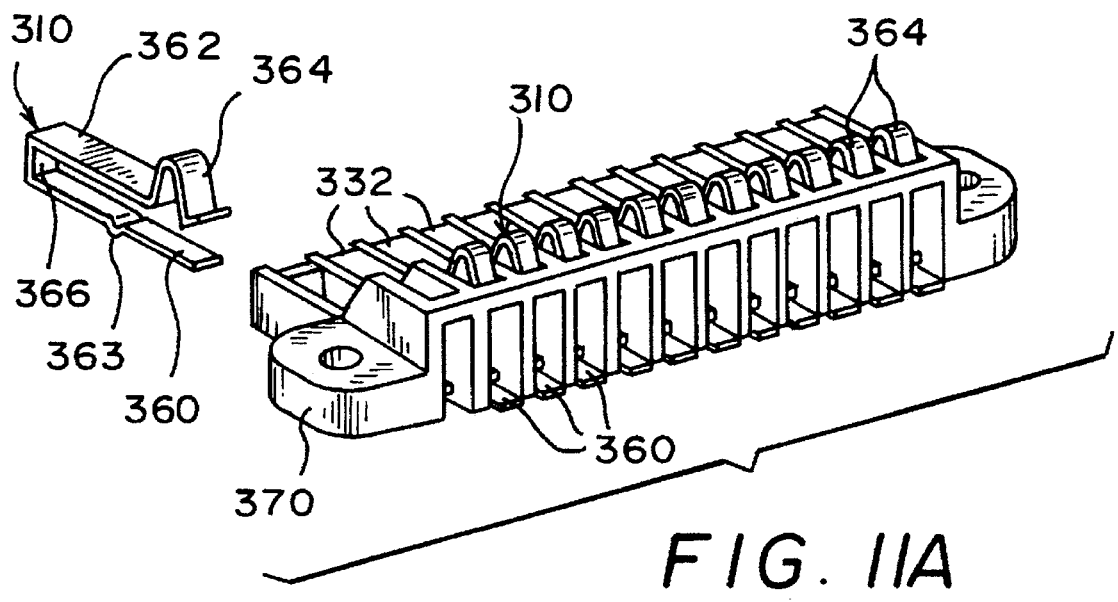
Figure 11B:
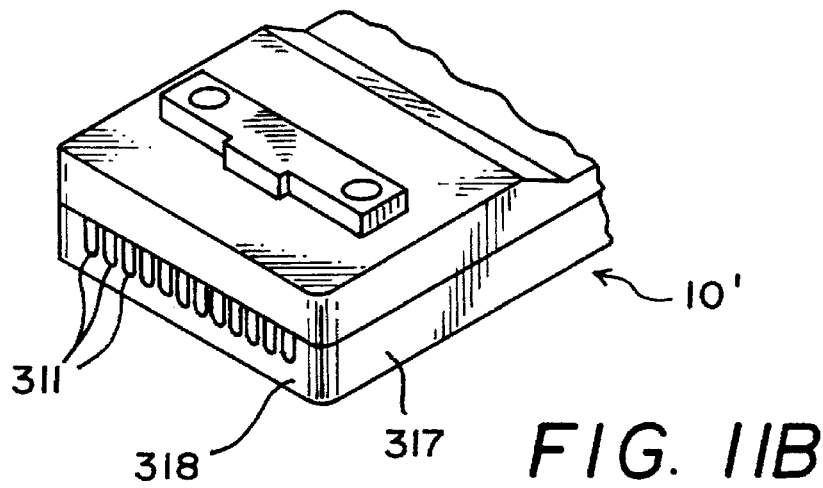

FIG. 11A is an enlarged perspective view of the contact end of a hand-held terminal employable with the invention; and FIG. 11B is an enlarged view of the electrically conducting element receiving member of the invention with one of the elements displaced therefrom.

DETAILED DESCRIPTION

FIG. 1 shows a system comprised of a portable battery operated data terminal 10 which may be connected through an adapter 11, and a set of peripheral devices such is 12–15 (e.g. devices that might be particularly suited for forklift truck applications), the terminal and peripheral devices being coupled via a local area network data bus 16 of a self-propelled manually steered vehicle 17. For the case of a forklift truck 17, adapters such as 11 may releasably accommodate terminals such as terminal 10 which receive and store data obtained by means of an optical bar code or RF tag scanner 18. As indicated at 19, vehicle power is generally available from the electrical system of the vehicle. Certain electric vehicles such as lift trucks may operate from voltages as high as 72 volts, so higher voltage operation must be accommodated as well as the more typical value of twelve volts.

A preferred LAN configuration for the embodiments of FIGS. 1 through 6 may have the characteristics (1) through (4) described in the section headed SUMMARY OF THE INVENTION, and as further detailed hereafter in reference to FIG. 5.

A general characteristic of each LAN connected device in FIGS. 1 through 6 is that communication and control intelligence is required to receive and transmit information through the LAN. The terminal (e.g. terminal 10, FIG. 1) with its processor and memory system may serve as a communication controller or primary processor while each peripheral device (such as 12–15, FIG. 1) may comprise a secondary unit which typically contains a microcomputer to perform communication and control tasks. Certain applications may involve multiple terminals (such as 21–26, FIG. 2) connected to a single LAN data bus such as vehicle bus 16, FIG. 1, or such as nAN data bus 27 of fixed installation 28, FIG. 2. Multiple adapters such as 31–36 enable communication from terminal to terminal, and from any of multiple terminals to an RS-232 interface means such as 15, FIG. 1, or 37, FIG. 2. Such an interface may be used for data interchange with a host computer system overseeing a multiplicity of vehicles (such as 17, FIG. 1) or fixed installations (such as 28, FIG. 2), and may include the LAN controller (as indicated for interface means 37, FIG. 2).

Vehicle mounted terminals such as terminal 10, FIG. 1, may be removed from vehicle adapters such as 11 at the end of a working shift and physically inserted into one of the adapters 31–36 of a fixed installation 28 for transfer of accumulated data to a host computer. Components 15 and 37 may comprise LAN controller and protocol converters for adapting to an external RS-232 transmission system. Alternatively, a vehicle such as 17 could itself be coupled with a host computer via interface means 15, e.g. while for the case of an electrically driven vehicle, the vehicle batteries were being recharged. In each case, the batteries of terminals such as 21–26, FIG. 2, would be recharged e.g. from AC power as indicated at 38, FIG. 2. Where interface means 15, FIG. 1, does not include the LAN controller, terminals such as 10 may be automatically switched when in adapter 11 so as to activate primary LAN programing enabling the microcomputer of terminal 10 to act as the LAN controller when on board vehicle 17. When such a terminal 10 is inserted in one of adaptors 31–36 on the other hand, the terminal would operate as a standard secondary unit, and be identified dynamically by means of the primary programming of the LAN controller of interface means 37.

Figure 2:
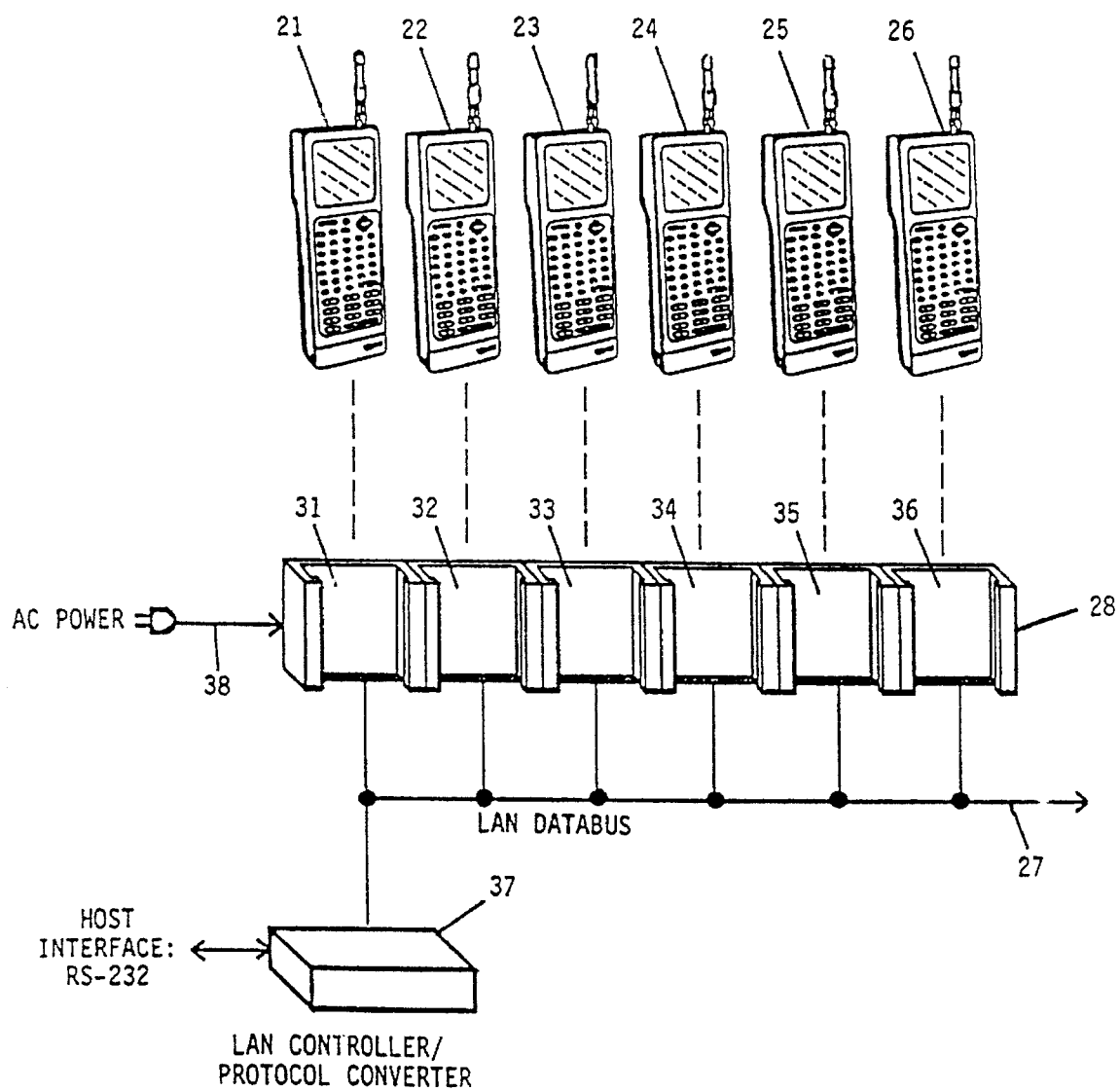
FIG. 2 shows by a similar diagrammatic illustration a fixed data system which may utilize adaptors and a local area network corresponding to that of FIG. 1, and may receive terminals from vehicles such as that of FIG. 1, for purposes of interchange of data with a host computer, and for recharging of the terminal batteries.

As shown in FIG. 3, a series of terminals such as 41–43 may be coupled with a LAN data bus 44 via respective adapters such as 45–47 which may be part of self propelled manually steered vehicle 48. Such multiple terminals can thus share peripheral devices on board the vehicle such as printer 49. Again the LAN controller may be external to the terminals, e.g. associated with printer 49 or an interface means such as 15, FIG. 1, or 37, FIG. 2.

FIG. 4 shows a diagram of a data terminal 60 and peripherals 61–67 in an arrangement that might be particularly suited to a route or delivery truck application. The LAN communication protocol is preferably designed to coordinate and resolve all of the resultant communication requirements. As in FIG. 1, terminal 60 may contain programming to act as the LAN controller and may be removably received in a mobile mount adapter 70 of a vehicle 71 which supplies operating and recharging power to the terminal batteries as indicated at 72. RF coupling means 67 may alternatively contain the network controller and further may couple the LAN data bus 73 with a stationary host so that data from terminal 60 and from measurement means 61–65 may be supplied periodically to a host computer system, and data from the host may be supplied for example to printer 66 as needed. In FIG. 1, LAN data bus 16 may have an RF modem coupled therewith, and in each of FIGS. 1, 3 and 4, the terminals may receive scheduling information or the like whenever required during a working day, from a host computer system via an RF link, for example. Thus on-line communication with a host computer may be established at any time. The network controller when separate from the terminal may contain a special buffer memory for storing data for one or more terminals which may be temporarily disconnected from the network. Such network controller and buffer memory may be part of an RF unit having two-way on-line communication with a host computer, in any of the embodiments of FIGS. 1–4.

Description of FIG. 5

The application of a LAN communication structure for networking multiple portable terminals may present unique difficulties since the portable terminals may be removed from the system for various purposes such as those previously described herein. Further it is desirable to provide a system whereby the terminals may be placed in generally random physical network locations by the terminal users. Preferably the terminals may be identified on a dynamic basis as they are added to the local area network, without requiring a unique "hard" terminal address for each terminal which may be associated with the network.

A unique feature of the preferred LAN protocol of the present invention is in its structure for addressing that establishes "virtual" rather than permanent physical identification of the communicating devices. This is advantageous in that communication sessions may involve a set of physical devices and connections that are constantly being changed and rearranged (as is common with portable data terminals and their peripherals). The implementation of the LAN communication protocol preferably conforms to the International Standards Organization (ISO) reference model for Open System Interconnection with the functional operations broken into "layers" as diagrammed in FIG. 5. A detailed description of the LAN protocol is include in Appendix A at the end of this DETAILED DESCRIPTION.

Description of FIG. 6

The physical electrical interface to the LAN is preferably as diagrammed in FIG. 6. Here the LAN data bus consists of a balanced two-wire signal pair 91 and 92 conforming to the EIA RS 485 interface standard with tri-state wire-OR capability for the desired multidrop characteristic. Because of the need for moderate line lengths (up to 100 feet), relatively fast signalling rates (up to 1 Mhz), and high immunity to electrical noise, the physical communication link must be treated as a transmission line with low characteristic impedance, typically 120 ohm. Line termination must be made through resistors such as 93 and 94 of a value equal to that characteristic impedance which results in a relatively high current required to drive a signal on the line. To achieve these characteristics, a line drive integrated circuit 95 is used that has sufficient output capability to provide the necessary output current. A typical device that has this capability is the Texas Instruments SN75176 type. In general, devices of this type are bipolar circuits that require significantly more operating current that is usually available in a portable product that is powered from batteries. To adapt the LAN data bus to the requirements of portable terminal devices such as shown in FIGS. 1–4, power to the line driver integrated circuit as indicated in FIG. 6 is switched e.g. by means of a power transistor 97 to minimize the battery current drain. Transistor 97 is shown as being controlled by a microcomputer 98 which may be part of the portable terminals of FIGS. 1–4. In general each peripheral in FIGS. 1–4 may also include a microcomputer for performing the functions of microcomputer 98.

It is useful to note that operation of the LAN is typically not needed when the terminal is being used in the portable mode, but is only required when the terminal is placed in a LAN interface adapter. In this mode, power for operation is provided externally from vehicle power rather than the terminal batteries. The quick removability of a terminal and scanner means from its mobile mount adapter means is symbolized by small circles 101 and 102 which in this case may represent the electrical connections formed between respective spring fingers 110, FIG. 7, of the mobile mount adapter means such as 11, and respective mating external contacts 111, FIGS. 7 and 9, of the terminal and scanner means.

With the driver/receiver and line termination arrangement as shown in FIG. 6, inactive or physically "not present" terminals represent virtually no loading or effect on the system. It is only when the terminal begins to transmit data that it is known to exist by the network. Consequently, no special switching or isolation is required to remove or replace a terminal from the system.

Description of FIGS. 7, 8 and 9

A significant difference between the LAN configurations typically used for personal computer networking and communications, and the configuration described here for use with portable data terminals has to do with the mechanical connector method employed for interface to the electrical network. Presently common commercially available LAN products may utilize coaxial cables and connectors, twisted pair conductors with some type of connector termination or in some cases, telephone wire with modular phone jacks. Each of these physical interface methods requires a "fastening" and "unfastening" operation when the attached device is connected and unconnected from the network. An important feature of the portable LAN described here is in its method of electrical connection between the LAN and the connected portable terminal which must be removed and replaced often during operation. To eliminate the need for fastening and unfastening of a connector, in a preferred embodiment conductive contacts 111 are exposed e.g. at an undersurface of each terminal such as terminal 10, FIG. 1, and each adapter such as 11 is provided with spring loaded mating contacts 110. The interface adapter holds the terminal securely in place while aligning the external contacts 111 with the mating contacts fingers 110. An additional feature of the LAN interface adapter for mobile mounting applications is in its "open face" which allows connection to a scanner such as 18, FIGS. 1 and 7, without impeding the placement and removal of the terminal from the adapter. Thus referring to FIG. 7, terminal 10 is shown in initial contact with the adapter indicated at 11, with a connector 120 leading to scanner 18 located in the open area of the adapter. The adapter may have a contact assembly 125 including spring fingers 110 aligned with respective terminal contacts 111. FIG. 8 is an enlarged view of contact assembly 125 and shows the initial position of contact finger 110 at 110A, and shows a deflected position at 110B (the terminal being fully inserted into and frictionally held by the adapter to maintain the deflected condition 110B of the spring fingers).

FIG. 9 is a bottom plan view of the terminal 10, showing its set of contacts such as 111, and showing connector fittings at 127 and 128 which may receive the scanner connector 120, FIG. 7. In FIGS. 7 and 9, adapter 11 is shown as comprising a base part 131 which may be notched at 132 to accommodate scanner fitting 120, and a pair of upstanding generally C shaped parts 133 and 134 which define a channel 135 for receiving the terminal 10. The parts 133 and 134 may have sloping surfaces such as 136, FIG. 7, which limit the downward movement of a terminal into the receiving channel, and serve to frictionally retain the terminal with a suitable degree of pressure between contacts such as 111 and mating spring fingers such as 110.

Discussion of Earlier Mobile System Development

The present application is related to the following earlier patent application: Phillip Miller et al application "MOBILE RESTAURANT SYSTEM AND NETWORK CONTROLLER THEREFOR" U.S. Ser. No. 06/915,023 filed Oct. 3, 1986, and abandoned Jan. 22, 1988.

The Miller et al application Ser. No. 06/915,023, is incorporated by reference in pending application Ser. No. 07/212,435 filed Jun. 28, 1988 and was also incorporated into a parent of application Ser. No. 07/212,435, namely U.S. Ser. No. 06/928,916 filed Nov. 7, 1986.

The application of Phillip Miller et al U.S. Ser. No. 06/915,023 is hereby incorporated herein by reference in its entirety.

The incorporated application U.S. Ser. No. 06/915,023 in a second figure thereof shows a system block diagram including a network controller (NC) with a "RS 485" communications port (91) connected with a "RS 485" multidrop bus system (75). System power from a vehicle power system (30, 31, 40) is supplied via a power line (PWR) to a series of point of sale registers (14-1 through 17-1) which are coupled to the RS 485 multidrop bus system (75). In a fourth figure, a physical layout of a vehicle is shown wherein a conduit (140-1) for power and data (PWR & DATA) contains both a multidrop data bus and power lines. Junction boxes (41-1, 51-1, 52-1, 54-1 and 55-1) serve to couple the multidrop data bus and power lines with the point of sale registers (14-1, 16-1, 17-1). An unused junction box is shown in the PWR & data line. The fifth figure of the incorporated application shows the distribution of power from a vehicle system power source (e.g. a data processing battery 40-1) to the network controller via a power function box (41-1) and a further junction box (51-1) at the network controller (NC). A sixth figure illustrates charging of the data processing battery (40-1) from an alternator via suitable battery isolator means (such as 31-1). The ninth figure indicates the segments of conduit (140-1A, 140-1B, 140-1C) between successive junction boxes (41-1, 51-1, 54-1, 55-1, 52-1). This same type of power and data conduit system may be utilized in the product distribution vehicles (such as forklift trucks and delivery vans) illustrated in FIGS. 1, 3 and 4 herein. Thus FIGS. 1, 3 and 4 may have devices 11 to 15, 45, 46, 47, 49, 61 to 67 and 70 receiving vehicle power in the same way as shown in the second and fourth figures of the incorporated application Ser. No. 06/915,023, for example, and FIGS. 1 to 4 may be provided with a network controller as shown in the twelfth figure through sixteenth figure (parts A through G) of the incorporated application.

The present disclosure represents significant improvements over the incorporated application, for example in providing one or more mobile mount adapters such as 11, FIG. 1, 45, 46, 47, FIG. 3, and 70, FIG. 4, on a multidrop data bus with diverse peripheral devices such as 12 to 15, FIG. 1, 49, FIG. 3, and 61 to 67, FIG. 4. Further, various devices may be added to the system on a dynamic basis during system operation, and assigned addresses as they become active on the network.

Additionally the conduit system containing the LAN data bus and power supply conductors may also contain a charging power line for supplying charging power to one of the contact fingers 116 which mates with the charging current input contact e.g. 111A, FIG. 9, of the terminal 10.

Discussion of Related Patent Application Concerning Battery Charging Control A pending application of Steven E. Koenck "MICROPROCESSOR CONTROLLED FAST CHARGING SYSTEM" U.S. Ser. No. 07/266,537 filed Nov. 2, 1988 is a continuation in part of pending application Ser. No. 07/168,352 filed Mar. 15, 1988, and the entire disclosures including the drawings of these applications Ser. No. 07/168,352 and Ser. No. 07/266,537 are hereby incorporated herein by reference.

The twenty-seventh figure of these incorporated applications shows a charging arrangement which may be applied to an individually manned transport vehicle with local area network system as taught herein. Thus terminal 10 of the present disclosure may incorporate the terminal system (27-10A) and battery pack (27-10B) of the twenty-seventh figure. A charger (27-22) may be mounted adjacent mobile mount adapter 11 and receive charging power from the vehicle. Where the vehicle system supplies power at a relatively high voltage such as seventy-two volts, preferably such voltage is reduced to a lower voltage value such as twelve volts at a location near the vehicle power source and then power at such lower voltage value is supplied by a suitable cable to the charger component (27-22). In this embodiment, the charger has terminals labeled +CHARGE, TEMP, GND, CHG CONTROL which would be connected to four of the spring fingers 110, FIG. 7, of the mobile mount adapter 11. The other two spring fingers 110 would be connected to the lines LAN+DATA and LAN−DATA of the twenty-seventh figure which would correspond with LAN data bus 16, FIG. 1. The LAN interface (27-39) of the twenty-seventh figure would include line driver/receiver 95, FIG. 6, which would receive +5 volts and the power control signal from the microcomputer of the terminal system (27-10A) of the twenty-seventh figure.

Where the terminal 10 is provided with an RF transceiver, the terminal may correspond with that described in the following pending application:

George E. Chadima, Jr. and Darald R. Schultz application Ser. No. 07/104,653 filed Oct. 2, 1987, "HAND-HELD COMPUTER SYSTEM".

The complete disclosure including the drawings of this application Ser. No. 07/104,653 is hereby incorporated herein by reference. Further information concerning RF, transceiver type terminals is found in APPENDIX B (not reproduced here, but that the referred-to Appendix is available in the file).

Discussion of Claim Terminology and Modifications Pertinent Thereto

FIGS. 1, 3 and 4 illustrate vehicle data systems for vehicles such as forklift trucks and delivery vans which are utilized in product transport processes and the like. Such vehicles normally contain vehicle electric power means associated with the vehicle drive, e.g. a motive power engine-driven alternator or generator and vehicle storage battery for use in starting the engine, or electric storage batteries which themselves provide the propulsion energy. The vehicle power represented at 19 in FIG. 1, and at 72 in FIG. 4 preferably is derived from the vehicle electric power means. Vehicle power may also energize the LAN devices 12 to 15, FIG. 1, 45, 46, 47 and 49, FIG. 3, and 66 and 67, FIG. 4, as well as the interface circuits for devices 12 to 15, 49 and 61 to 67 which may correspond with LAN interface 95, 97, 98, FIG. 6. In such a case vehicle power is supplied via suitable voltage regulator means to points such as 140 and 141 in FIG. 6 as well as to microcomputer 98, for each device permanently associated with the LAN data bus in FIGS. 1, 3 and 4. Where components such as 95, 97, 98 in FIG. 6 are part of a removable device such as terminal 10, FIG. 1, terminals 41, 42, 43, FIG. 3, and 60, FIG. 4, such components may be supplied from battery power carried with the removable device, or from charging power (+CHG) derived from the vehicle electric power means, e.g. 19 or 72. The local area network means of FIGS. 1, 3 and 4 is preferably powered at least in part from vehicle electric power means and independently of fixed power sources (such as represented at 38 in FIG. 2).

While FIG. 1 shows an optical or RF scanner means 18 connected by a cable 150 and cable fitting 120 with a connector of the terminal 10 to form data terminal and scanner means, parts 10 and 18 may be in a single unit as shown for example in a pending application of Phillip Miller, et al, U.S. Ser. No. 07/136,097 filed Dec. 21, 1987. The entire disclosure of this application including the drawings is incorporated herein by reference. The handle (15) of the first and third figures of the incorporated drawings of Ser. No. 07/136,097 may contain a series of external contacts corresponding to contacts 111, FIGS. 7 and 9, for engaging with spring fingers corresponding to fingers 110, FIGS. 7 and 8. In this case, the receiving channel of the mobile mount adapters of FIGS. 1 through 4 would frictionally receive the handgrip part (15) and support the horizontally extended undersurface of the scanner barrel, while providing adequate clearance so as to insure against actuation of the trigger (32) as the scanner and terminal means (10) is inserted into and removed from the various adapters. Convenient access to the card receptacle (20) of the incorporated scanner and terminal means would thus be provided while the scanner and terminal unit was in place in each adapter. Also the scanner and terminal unit would be held securely to enable normal application of manual pressure to the keyboard segments (11a, 11B).

Alternatively, the mobile mount adapters may contain interface components such as 95, 97, 98 which are energized from vehicle power, and also alternatively an optical coupling may be provided between a light emitting diode and light sensor of the scanner and terminal unit of the incorporated application and the microcomputer 98 within each adapter for accommodating the interchange of data between the scanner and terminal unit and the LAN data bus, e.g. to effect printout of data from the scanner and terminal unit on a printer such as 14, FIG. 1, 49, FIG. 3 or 66, FIG. 4, or to effect transmission of data via component 37, FIG. 2, or 67, FIG. 4.

The present invention is particularly directed to an individually manned transport vehicle where the driver of the vehicle is the one concerned with operation of the on board devices. Since the driver at times must devote full attention to guidance of the vehicle, it is particularly appropriate that the data capture devices can be quickly inserted into and removed from mobile mount adapters, so that the driver may be completely unencumbered while driving the vehicle. It is advantageous to have a large area display which can be read at a distance e.g. from the driver seat of the vehicle. Such a display can provide information which is useful in moving from one work location to another, e.g. geographical type information; the display being positioned so that such information can be read at a glance e.g. during a brief stop of the vehicle while the driver remains at the controls of the vehicle.

Each of the connectors such as represented at 161 to 165, FIG. 1, 166 to 169, FIG. 3, and 171 to 173, FIG. 4, may be a standardized quick-connect and quick-disconnect type so that adapters and devices may be interchanged and placed at desired locations about each type of individually manned transport vehicle. For example, each connection such as 161 may include a set of spring fingers such as 110 receiving the LAN+ and LAN− connections such as 101, 102, FIG. 6. Each device may then include an interface such as shown at 95, 97, 98, and power supply means for energizing these components from vehicle electric power, (vehicle electric power being available e.g. from a twelve-volt d.c. plug-in power receptacle adjacent each connection 161–169, 171–173).

Each connection such as 110, 111, FIG. 7, may be maintained by a frictional ball and socket type detent such as indicated at 180, FIG. 7, which seats with an audible click into a terminal recess 181 when correct deflection of spring contacts 110 has been achieved.

Discussion of Existing Commercially Available Components

The Route-commander® system by Norand consisting of a high-performance portable data terminal coupled to a ruggedized printer has virtually eliminated the use of manual route books and handwritten invoices in the beverage, snack, dairy and bakery delivery industries. Literature on this system is shown in APPENDIX C (not reproduced here, but that the referred-to Appendix is available in the file). This is one example where an individually manned transport vehicle may utilize a vehicle data system as disclosed herein.

With the introduction of low cost, efficient data communication radio systems such as the RT1200 and 2200 systems by Norand, it has become attractive to utilize radio data communications to automate the information processes used in material handling, particularly on lift trucks. The RT1210 and RT2210 data terminals are battery powered hand-held two-way radio data transceivers with keyboard, LCD display, built-in radio communication hardware and support for high-performance optical bar code readers. Communication to the portable terminals is accomplished by interfacing an RM2216 terminal multiplexor and RB2212 base transceiver to a host computer through a communication port. The host computer may transmit to or receive data from any selected terminal at any time. Although the RT1210 and RT2210 terminals were originally designed for hand-held operation, they have been used in mobile applications by placing the entire terminal into a receptacle which holds the unit firmly in place and isolates the unit from vibration and shock. Power for operation is provided by the terminal battery pack. Literature pertaining to the commercially available components is shown in APPENDIX B (not reproduced here, but that the referred-to Appendix is available in the file).

It will be apparent that many modifications and variations may be effected without departing from the scope of the novel teachings and concepts of the present disclosure.

Description of FIG. 10

FIG. 10 is a perspective view showing a series of adapter means 231–236 arranged in side by side relationship to form a fixed installation 228 of the general shown in FIG. 2. In FIG. 10, the adapters 231–236 are mounted within an elongated cradle 240. The cradle 240 is supported at a slight incline by a support base 246 and upstanding wall 248. Mounting means 252 is optionally available to secure the support wall 248 to a vertical structure if desired.

As shown in FIG. 10, a data entry terminal such as 254 may be placed in each of the adapters such as 232.

As shown in FIG. 2, the installation 228 may have electric power receiving means corresponding to means 38, and data path means for conveying data corresponding to means 27 and powered at least in part from the electric power receiving means, e.g. via a circuit point such as 140, FIG. 6. The data entry terminal 254 comprises portable data device means including for example a line driver integrated circuit such as 95, FIG. 6, and a microcomputer such as 98 which controls an on-board transistor such as 97.

Each of the adapters 231–236 has connection means such as two of the spring contacts of an array 260, which couple with respective surface contacts of the terminal as explained in detail in the incorporated Davis U.S. Pat. No. 5,052,943. The quick removability of the terminal such as 254 may be a symbolized by the small circles 101 and 102 in FIG. 6. As previously mentioned, the interchange of data between the terminal and the data path means may take place via an optical coupling instead of direct physical contact.

The terminal 254, like terminals 21–26, FIG. 2, has a frontal side 262 with user interface means 263 such as a keyboard and display, and lateral margins such as 262A and 262B which may be covered without obstructing the user interface means.

Each adapter defines a receptacle such as 270 with an open top for receiving a terminal, a frontal side of the adapter exposing the user interface means as shown in FIG. 10 for adapter 232, while the terminal is securely retained in the adapter.

Each adapter has a slotted frontal wall such as 272 providing a frontal opening 274 which is entirely unobstructed in an upward direction such that a lower portion of the user interface 263 may be accessible over the entire extent of the frontal opening 274, and the upper portion of the user interface 263 may be accessible above the frontal wall.

Each adapter has guides e.g. in the form of edge portions 276 for engagement with the lateral margins 262A and 262B of the terminal without obstructing the user interface means, while accommodating quick removal of the terminal from the adapter in a single upward movement. Further information on adapter structure is found in earlier applications Ser. No. 07/346,771 filed May 2, 1989, Ser. No. 07/347,298 filed May 2, 1989, Ser. No. 07/347,602 filed May 3, 1989, and Ser. No. 07/347,849 filed May 3, 1989, and each of these earlier applications is hereby incorporated herein in its entirety including drawings and appendices.

FIG. 10 represents a model 4960 Multi Dock unit available commercially from Norand Corporation, Cedar Rapids, Iowa. The Model 4960 holds up to six 4000 Series hand-held computers, and may connect to a Model 4980 Network Controller or to a Model 4970 Auxiliary Power unit to allow hand-held computer communications and charging. A brochure illustrating the commercially available units is identified as number 960-131-903 with a copyright date of 1992. Model 4300 and 4310 handheld computers are described in a brochure number 960-133-908 with a copyright date of 1991.

FIG 11B discloses, from the rear, the lower end 317 of housing 6 of the hand-held data entry terminal 10' similar to that of FIG. 1. A plurality of contact pads 310 are positioned upon an end wall 318 of data entry terminal 10'.

Referring to FIG. 11A, a plurality of contact elements 310 are deployed within a contact receiving element 310 with one contact element 310 displaced therefrom for illustration of detail. Each contact element 310 comprises a formed conductive strip having a first leg 360. Free ended section 362 of contact element 310 is provided with a generally U-shaped area 364 therealong. First leg 360 and free ended section 362 are formed in generally parallel relationship separated by a reversing section 366. Contact elements 310 are constructed of electrically conductive material with sufficient resilience such that free ended motion 362 will return to its generally parallel relationship to first leg 360 when not subjected to deflective force.

Each contact element 310 is fitted into contact receiving member 370 such that contact elements 310 are spaced apart in generally parallel relationship with U-shaped sections 364 depending thereabove. Free ended section 362 including U-shaped section 364 are free to be deflected somewhat downward when contact elements 310 are positioned within contact receiving member 370. First leg 360 of contact element 32 is provided with a protrusion 363 upon the lower surface 361 thereof, said protrusion 363 establishing electrical contact with a conductive area upon a circuit board to which contact receiving member 370 may be mounted.

Of course, the contact receiving member 370 must be made of a non-conductive or insulating material. If the contact receiving member 370 was made of a conductive material, all of the contact elements 310 would be shorted together.

FIG. 7 shows a holster 190 on base 131 for receiving and securely retaining a scanner such as 18, e.g. by a resilient liner 191 of the holster 190 frictionally engaging with a barrel 192 of the scanner. The holster 190 may be constructed e.g. at 193 to hold the handgrip part 194 and trigger 195 clear thereof so that the scanner of FIG. 7 is quickly and easily removed by manually grasping the handgrip part 194, and so that the trigger 195 will not be actuated as the scanner is manually inserted into the holster.

The scanner for bar codes need not be physically attached to the terminal. In configurations for warehouse scanning systems, a lot of the software effort involved may represent the accommodation of the periodic removal of major sections of the system to do remote scanning of marginally accessible codes. In conventional practice the scanner is always attached to the terminal by a pendant cable and if the code to be scanned is beyond the reach of the cable then the terminal must necessarily be removed from its holster. The terminal may represent a very significant portion of a "LAN" system and to remove it in this fashion may disable the system generally. Placing the terminal in its holster again may entail the reestablishment of the hierarchial or virtual address structure that was established prior to the removal of the terminal.

If, however, it is possible to only remove the scanner and to not be tied to the terminal by a cable then the degree of disability imposed upon the "LAN" system is significantly lessened and the software effort to develop such a system would be reduced.

The terminals now incorporate various types of scanner interfaces. Some of them have been add-on devices to accommodate scanner types manufactured by third parties. Others have been built-in and have been used to communicate with scanners such as shown in U.S. Pat. No. 4,766,300. Some of these handheld terminal devices provide power converters accommodating the requirements idiosynoratic to specific scanner types. All of such scanners directly draw power from the terminal, reducing operational time per battery charge.

A scanner such as 18, FIG. 7, may be operated while disconnected from the terminal on a permanent basis. Terminals presently connect with a host by an RF link and maintain contact without benefit of cable. Of course, terminals mounted on a vehicle will be drawing their power from the vehicular electrical system. The power requirements for a scanner connected by cable to a terminal on a vehicle as in FIG. 7 will not be a large factor in the power budget imposed upon the terminal.

Detaching the terminal from the scanner completely, provides benefits in the area of flexibility and ease of use. Since the scanner doesn't require contact with or attachment to the terminal the job of providing operating power no longer is the province of the terminal. The scanner, being completely portable would require its own battery pack but this pack would not have to be unusually capacious. Once the scanning function has been performed the scanner can be reinserted in its holster on the vehicle and charged back up to full capacity from vehicle power by its own charger.

The communication link replacing cable 150, FIG. 7, may be ultrasonic but could also be infrared or even another very low power RF link. Various modulation and demodulation schemes could be employed and the choice of the most appropriate means of encoding data on the channel would depend greatly upon the channel type used. Once the code had been read, the link between the scanner and the terminal could employ one of the various error checking and correcting procedures.

Physically the terminals would still incorporate a form of scanner interface but the link would not be mechanical. It would be desirable to provide a bidirectional data path. The scanner would include the matching interface to implement the link and using a bidirectional data path the scanner could receive an acknowledgement after a scan. Reception of such an acknowledgement would constitute an indication of a valid scan and the illumination of an indicator light would provide operator feedback. The lack of a response from the terminal in a specified time period would constitute a negative acknowledgement and another indication on the scanner would signal the operator that another scan was necessary.

Appropriate scanners for this type of operation would include current wand and modified CCD type scanners of Norand Corporation and a number of other manufacturer's laser scanners.

This scanner would be used typically, by a forklift operator in close proximity to his vehicle. Limited range would not be a significant deterrent here and may even be a benefit in an operation where multiple units are in use.

APPENDIX A

LOCAL AREA NETWORK
(LAN) PROTOCOL DEFINITION

1. Purpose

This document defines a communication protocol for Norand portable equipment. The protocol will function with the new data terminals and new peripherals. It will be the protocol used on the local area network to which the terminals connect.

This document is broken into sections on each of the layers: physical, data link control, network, transport, session, presentation and application. Several of the sections are quite brief and complete specifications are addressed in other documents.

2. Physical Layer

The physical layer is the actual hardware required to physically connect to the network. It varies depending on the network and will not be addressed in this document. There will be a separate document for each physical layer and for each Media Access Control (MAC) sublayer of the Data Link Control.

3. Data Link Control Layer

3.1 Basics

The Data Link Control (DLC) layer is an HDLC-like protocol implementation. It provides for polling by a primary station to secondary stations. This usage is called Normal Response Mode (NRM). A major difference is the added capability for auto-configuration of the network. The mechanism used for this is the Non-Specific Poll or NSP.

3.2 Sublayers

The DLC is designed as two sublayers similar to those in the IEEE 802 specifications. The two layers are Media Access Control (MAC) and Logical Link Control (LLC).

3.2.1 Media Access Control Sublayer

Media Access Control isolates the part of the DLC that has to interface with the physical layer. MAC provides a consistant interface with LLC so that any physical interface could be used. It isolates the LLC sublayer from any knowledge of bit rates, error checking techniques, data transparency etc.

3.2.2 Logical Link Control Sublayer

Logical Link Control provides the actual control of the DLC peer to peer communications. It is basically a set of state machines used to manage what to send in response to all possible inputs. The secondary and the primary have different requirements for the state machines. The primary must provide the polling mechanism. The primary also must implement all recovery actions for link failures.

3.3 MAC requirements

3.3.1 LLC-MAC Interface

The interface between LLC and MAC is composed of commands, responses and indicators. These are broken down as follows:

3.3.1.1 Commands

| Command | Parms | Usage |
|---------|-------|-------|
| SEND | address,data | send frame |
| RECEIVE | timeout(y/n) | with timeout for primary |
| AVCOL | | used in response to NSP, collision avoidance |
| RESET | | reset the MAC |
| CONFIGURE | parms | parms to configure the MAC as required by LLC |

LAN Protocol Definition Rev. B      page 1      October 31, 1988      Joe Kubler

3.3.1.2 Responses

The responses to each of the commands are listed in the table below:

| Response | Status | Usage |
|---|---|---|
| SEND | STATUS | after MAC is done transmitting it will return status. See below for status definition. |
| RECEIVE | STATUS | MAC responds after setting up receiver and timer for timeout if required. When data comes in, MAC or a timeout occurs, uses an indicator to LLC. |
| RESET | STATUS | when MAC has reset, it responds. |
| CONFIGURE | STATUS | when MAC has configured, it responds. |

The status field definitions are as follows:

1. Command OK
2. MAC failure
3. Physical layer failure
4. AVCOL status of SEND or NOSEND

3.3.1.3 Indicators

Indicators are asynchronous messages from the MAC to the LLC. They are used to pass data from the link to the LLC.

| Indicator | Parms |
|---|---|
| SEND | OK or timeout |
| RECEIVE | address, status, data |

The status field must indicate the following conditions:

1. The MAC is passing error free data to the LLC.
2. CRC error, or other error in frame
3. Timeout
4. MAC failure.
5. Physical layer failure.
6. Frame too short.
7. Frame too long.

3.3.2 Data Transparency

The MAC will provide data transparency. The LLC will pass data to the MAC without knowledge of any transformations needed to pass the data to the physical layer.

3.3.3 Error Detection

The MAC will handle link communication errors in a method entirely transparent to the LLC. This includes any CRC fields added to the frame. Received data having errors are logged and thrown away. A timeout may result.

3.4 Logical Link Control Definition

3.4.1 Basics

LLC is an HDLC-like protocol. It implements an unbalanced mode of operation, Normal Response Mode. This is a primary (controller), secondary (terminal) type operation. The primary polls or sends information to the secondary at which time the secondary can respond with information, or a frame acknowledging the received frame.

LAN Protocol Definition Rev. B     page 2     October 31, 1988     Joe Kubler

The major difference between HDLC and LLC is that LLC needs to implement a non-specific poll (NSP) mechanism. This is used to provide an auto-configuration capability. Using the NSP allows the primary to assign addresses to secondaries, thereby removing the requirement that secondaries be assigned an address when the network is configured.

3.4.2  Configuration Parameters 3.4.2.1  Secondary Configuration Parameters

Some parameters needed by a secondary station are: which MAC to use, buffer size, number of buffers, and window time (needed for making responses to NSPs).

3.4.2.2  Primary Configuration Parameters

The primary needs the following parameters: I-frame retries (for errors during transmission - using all the retries on a secondary results in the secondary being disconnected), the number of normal polls before doing an NSP, buffer size, and the number of buffers.

3.4.3  Protocol Data Units  (PDU)

The PDU format is as follows:

<Device-address> <Control-field> <I-field> where:  Device-address     - address of device. An address of all '1's is the global address. All secondaries will read frames with this address.
       Control-field      = type of frame (see next section).
       I-field            = Data characters maxlength 1024, minimum length is 0.

These fields are passed as parameters to the MAC sublayer and are used by the MAC to build the frames. These fields are also passed by the MAC to the LLC when a frame is received. Note that this allows the MAC to build the frame as it sees fit, for instance, the Device-address field might be passed to the MAC as a two byte field and transmitted as one byte.

3.4.4 Control-field Usage

The control field usage is similar to that found in HDLC. There are three types of frames: Unnumbered frames, Supervisory frames and Information frames. The frame formats are as follows:

```
Type         Bits    7 6 5 4 3 2 1 0

Unnumbered           1 X X X 1 1 1 1
                         | | |
                         +-+-+--------- Type of Unnumbered frame
                                        000 DISC
                                        001 SNRM
                                        010 UA
                                        011 FRMR
                                        100 TEST
                                        101 NSP
                                        110 XID
                                        111 RESET Supervisory          1 R R R 0 Y 0 1
                         | | |   |
                         | | |   +----- 0=RR  1=RNR
                         | | |
                         +-+-+--------- NR sequence count I-frame              1 R R R S S S 0
                         | | | | | |
                         | | | +-+-+--- NS sequence count
                         | | |
                         +-+-+--------- NR count
```

3.4.5 Unnumbered frames

Unnumbered frames are used to control the state of the link. Frames can originate with the primary or the secondary. The following table indicates where the frame can originate and the code for the type of Unnumbered frame. Frames from the primary are commands and frames from the secondary are responses.

| Type  | Command | Response | Value(hex) | I-field |
|-------|---------|----------|------------|---------|
| DISC  | yes     | no       | 8F         | no      |
| SNRM  | yes     | no       | 9F         | no      |
| UA    | no      | yes      | AF         | no      |
| FRMR  | no      | yes      | BF         | yes     |
| TEST  | yes     | yes      | CF         | yes     |
| NSP   | yes     | yes      | DF         | yes     |
| XID   | yes     | yes      | EF         | yes     |
| RESET | yes     | no       | FF         | no      |

3.4.5.1 DISC

DISC is used to place the secondary in Normal Disconnect Mode (NDM). In NDM the secondary can accept only SNRM, NSP, XID or RESET frames.

3.4.5.2 SNRM

SNRM places the secondary into Normal Response Mode (NRM). In NRM the secondary can receive any valid frame. This command resets the secondary's state variables so that the NS and the NR of the primary and the secondary are in sync.

3.4.5.3 UA

UA is used to respond to DISC, SNRM and NSP to inform the primary that the command was executed.

3.4.5.4 FRMR

FRMR is used to inform the primary that a protocol error has occured. It contains one byte of data in the I-field to indicate the failure. The following table defines the reason codes.

| I-field(hex) | Failure |
| --- | --- |
| 01 | Invalid frame received. This is a protocol error. |
| 02 | Received NR did not match expected NR. |
| 03 | Received NS did not match expected NS. |
| 04 | Frame can only be processed in NRM and secondary is in NDM. |
| 05 | Frame too short. |
| 06 | Frame too long. |

If the secondary transmits FRMR, it enters NDM. The primary is responsible for recovery. If the secondary sends FRMR in response to an I-frame, the I-frame is lost.

3.4.5.5 TEST

TEST is used to check out the communication path from the primary to the secondary and vice versa. The secondary will simply take the received data in the I-field and send it back to the primary.

3.4.5.6 NSP

NSP is the Non-Specific Poll command. It is used by the primary to configure the address of another secondary. Any secondary that requires a connection may respond with a UA, thereby acquiring the use of that address until disconnect. Since multiple secondaries may respond, each will perform a collision avoidance algorithm that picks a random time to delay before responding. The primary can choose addresses in any manner desired.

3.4.5.7 XID

XID is used to identify the type of secondary. The I-field will be encoded with information defining the capabilities of the sender. The I-field is formatted as follows:

| Field | Usage |
| --- | --- |
| link type | 1 byte. 0=secondary, 1=primary |
| device type | 2 bytes. Norand defined device type (ie. RF terminal, route accounting terminal, printer, LAN controller, etc.) |
| version | 1 byte. Version number of software in device. |
| revision | 1 byte. Revision number of software. |
| serial# | 4 bytes. Serial number of unit. |
| session limit | 2 bytes. Maximum number of sessions unit can support. |
| other info | System specific. A system may encode a name that could be used by higher layers for session establishment, etc. |

3.4.5.8 RESET

RESET is used to force the secondary to reset in the event it is non-responsive to any other message. This is a last resort message because the secondary is completely reset and any pending buffers of data are cleared.

3.4.6 Supervisory Frames

Supervisory frames are used by the primary to poll the secondary for any frames it needs to send to the primary. The primary will normally poll with a Receiver Ready (RR). If the primary is busy (this could happen if the primary has filled up all its buffers with messages from the data link), it will poll with a Receiver Not Ready (RNR) thereby idling the data link and informing the secondaries that the link remains active but that the primary cannot receive I-frames from the secondary.

If the secondary has no message and it is capable of receiving a message (in particular an I-frame) then it responds with an RR. If the secondary has no buffer for receiving an I-field, then it can send an RNR. If the RNR is in response to an I-frame, that I-frame may be ignored if the NR field in the RNR does not acknowledge the I-frame and must be resent later by the primary when the secondary can receive it. This will occur when the secondary's buffers free up and it starts responding with RRs.

Once either station has sent an RNR, it remains in RNR mode until it sends an RR. This allows that station to send I-frames while in RNR mode. In some cases this may be what is needed to free up input buffers.

The secondary must be able to receive a RESET even if it is responding to polls with RNR.

The NR field is used to indicate what number of I-frame is expected next.

3.4.7 I-frames

I-frames are used to send data to the secondary or to receive data from the secondary. The NR field is used to indicate what number of I-frame is next expected by the sender of this I-frame and the NS is the number of this I-frame. The use of NR and NS provides for a frame acknowledgement mechanism and also prevents loss of frames. (See the next section for examples.)

3.4.8 Data Link Exchange Examples

This section contains examples of data flows on the link. The format of the examples is that the primary is on the left and the secondary is on the right. An arrow shows the direction of data flow. Before the starting point of an arrow is a description of the message. A message is one of the following:

```
NSP(address)
RR(address,NR)
RNR(address,NR)
I(address,NR,NS)
SNRM(address)
UA(address)
FRMR(address,reason)
```

3.4.8.1 Connection Establishment

This example shows two secondaries being activated. One is auto-configured and the other is hard-configured at install time.

```
NSP(A)      ------>
            <------ UA(A)
SNRM(A)     ------>
            <------ UA(A)    A is activated
SNRM(B)     ------>
            <------ UA(B)    B is activated
```

LAN Protocol Definition Rev. B     page 6     October 31, 1988     Joe Kubler

3.4.8.2 I-frame Exchange

```
RR(C,sc)      ------>              A has data to send
              <------ RR(C,rc)
RR(A,sa)      ------>              primary starts at top of polling loop
                                   again
              <------ I(A,ra,sa)   A sends its data
RR(b,sb)      ------>              no data from other secondaries
              <------ RR(B,rb)
RR(C,sc)      ------>
              <------ RR(C,rc)
RR(A,sa+1)    ------>              primary acks A's data
              <------ RR(A,ra)     A is done
    .
    .                              (later)
    .
I(B,sb,rb)    ------>              primary has data for B
              <------ RR(B,sb+1)   B acks the data
```

3.4.8.3 Receiver Not Ready (RNR)

```
RR(A,sa)      ------>              Secondary has data, but no
              <------ RNR(A,ra)    buffer. Must enter RNR mode.
RR(A,sa)      ------>              Now secondary can send the I-frame.
              <------ I(A,ra,sa)
RR(A,sa+1)    ------>              Primary has data, but since secondary is
                                   in RNR mode, it must wait to send it.
              <------ RNR(A,ra)
RR(A,sa+1)    ------>              Secondary has buffer again.
              <------ RR(A,ra)
I(A,ra,sa+1)  ------>
              <------ RR(A,ra+1)   Sent and ack'ed.
```

3.4.8.4 CRC Errors

This example assumes that the primary has detected that the secondary is ready to send.
If the network is using contention mode, then an NSP will have been used.

```
RR(B,sb)      ------>              Primary specific polls B.
              <------ I(B,rb,sb)   B sends some data that primary receives
                                   with a CRC error.
    .
    .                              Primary times out waiting.
    .
RR(B,sb)      ------>              Primary polls B again with same NR
                                   indicating to B that it did not receive
                                   the last frame.
              <------ I(B,rb,sb)   B resends.
RR(B,sb+1)    ------>              Primary acks the data.
              <------ RR(B,rb)     B is done.
    .
    .                              Host will send to C.
    .
I(C,sc,rc)    ------>              CRC error, C ignores.
    .
    .                              Host times out waiting for response.
    .
I(C,sc,rc)    ------>              Host retransmits.
              <------ RR(C,rc+1)   C acks frame.
```

LAN Protocol Definition Rev. B    page 7    October 31, 1988    Joe Kubler

3.4.8.5 Response Frame CRC error

This example assumes that any non-specific polling has already successfully occured.

```
RR(A,sa)        ------>                    Primary polls A for data.
                <------ I(A,ra,sa)         A sends data.
RR(A,sa+1)      ------>                    Primary's ack has CRC error and is ignored
                                           by A.
        .
        .                                  primary times out waiting for A's response
        .
RR(A,sa+1)      ------>                    A receives ack this time.
                <------ RR(A,ra)           A is done.
I(B,sb,rb)      ------>                    Primary has data for B.
                <------ RR(B,rb+1)         B's ack has CRC error.
        .
        .                                  Primary times out.
        .
I(B,sb,rb)      ------>                    Primary retransmits.
                <------ RR(B,rb+1)         B ignores data with same NS and resends
                                           ack. B does not send a FRMR because the
                                           NS was the same as the previous NS. If
                                           the NS had been anything other than rb or
                                           rb+1, then B would send an FRMR.
```

3.4.8.6 Sequence Error in NR

```
RR(A,sa)        ------>
                <------ I(A,ra,sa)
RR(A,sa+1)      ------>
                <------ RR(A,ra)
        .
        .                                  (later)
        .
RR(A,sa+2)      ------>
                <------ FRMR(A,2)          NR from primary is in error
```

3.4.8.7 Sequence Error in NS

```
RR(A,sa)        ------>
                <------ I(A,ra,sa)
RR(A,sa+1)      ------>
                <------ RR(A,ra)
I(A,sa+1,ra+1)  ------>                    NS is in error, should be ra
                <------ FRMR(A,3)
```

3.4.9 Secondary State Machine

Following is a state table for the secondary protocol. The states are across the top and inputs are down the left side. The states are NDM, NRM and RSP. NRM is a state in NRM that indicates the secondary is not awaiting an acknowledgement to an I-frame that it has sent. RSP indicates the secondary has sent an I-frame and expects an acknowledgement. RSP is needed because a CRC error may have occurred
on the I-frame and the host may poll with an NR different from what the secondary expects after sending the I-frame. In this case the NR should be one less than the NS and that does not mean the secondary should send a FRMR but should resend the I-frame.

If the primary sends an I-frame with an NS one less than what the secondary expects, then the secondary ignores the I-frame assuming that the primary missed the original response acknowledging that I-frame.

LAN Protocol Definition Rev. B      page 8      October 31,1988      Joe Kubler

RSP also allows for another I-frame to be sent if one is available. For example, the secondary sends an I-frame to the host, the host sends another poll (RR) with an NR indicating that it accepted the I-frame, and meanwhile another messages is ready to be sent by the secondary. The secondary sends the new I-frame and remains in RSP.

Each state entry consists of three lines. Line one indicates the frame to be sent if any, based on current values for VS and VR. VS is the internal value kept by the secondary for the NS of its next I-frame and VR is the expected value of the next NR from the host. Line two indicates the state transition and line three is used to indicate what action to take. The action is a letter from the table following the state table. The word error on line2 indicates a state that should not be reached and it is a serious error to get to it.

It is assumed that frames with errors get ignored and that if the LLC receives I-fields that it has no communication buffer for then it should ignore the data.

In the input section of the table 'sendq' is used. This is an indication that the network layer has data to send. In the action section, dequeue means that the 'sendq' indicator has been acknowledged. This does not imply that the data has been sent.

The management of auto-configuration and of the primary being in RNR mode is not done by this state machine.

State Table for Secondary

| Inputs | NDM | NRM | RSP |
|---|---|---|---|
| SNRM | UA<br>NRM<br>a | UA<br>NRM<br>a | UA<br>NRM<br>a |
| RNR NR=VS | FRMR NDM<br>NDM<br>- | RR(VR)<br>NRM<br>- | RR(VR)<br>NRM<br>g |
| RNR NR inv * | FRMR NDM<br>NDM<br>- | FRMR NR~=NS<br>NDM<br>j | FRMR NR~=NS<br>NDM<br>j |
| RNR NR=VS-1 | FRMR NDM<br>NDM<br>- | FRMR NR~=NS<br>NDM<br>- | RR(VR)<br>RSP<br>- |
| RNR NR=VS<br>no input<br>buffer | FRMR NDM<br>NDM<br>- | RNR(VR)<br>NRM<br>- | RNR(VR)<br>NRM<br>g |
| RR NR=VS<br>sendq empty | FRMR NDM<br>NDM<br>- | RR(VR)<br>NRM<br>- | RR(VR)<br>NRM<br>g |
| RR NR=VS<br>sendq ~empty | FRMR NDM<br>NDM<br>f | I(VS,VR)<br>RSP<br>b | I(VS,VR)<br>RSP<br>l |
| RR NR inv * | FRMR NDM<br>NDM<br>- | FRMR NR~=NS<br>NDM<br>j | FRMR NR~=NS<br>NDM<br>j |
| RR NR=VS-1 | FRMR NDM<br>NDM<br>- | FRMR NR~=NS<br>NDM<br>j | I(VS-1,VR)<br>RSP<br>- |
| RR NR=VS<br>no input<br>buffer | FRMR NDM<br>NDM<br>- | RNR(VR)<br>NRM<br>- | RNR(VR)<br>NRM<br>g |
| I NR=VS<br>NS=VR<br>sendq empty | FRMR NDM<br>NDM<br>k | RR(VR+1)<br>NRM<br>c | RR(VR+1)<br>NRM<br>m |
| I NR=VS<br>NS=VR<br>sendq~empty | FRMR NDM<br>NDM<br>q | I(VS,VR+1)<br>RSP<br>d | I(VS,VR+1)<br>RSP<br>n |

\* NR is invalid if NR>VS or NR<VS and no I-frames have been received.

LAN Protocol Definition Rev. B    page 10    October 31,1988    Joe Kubler

State Table for Secondary (cont)

| Inputs | NDM | NRM | RSP |
|---|---|---|---|
| I NR inv *<br>NS=VR | FRMR NDM<br>NDM<br>- | FRMR NR~=VS<br>NDM<br>j | FRMR NR~=VS<br>NDM<br>j |
| I NR=VS-1<br>NS=VR | FRMR NDM<br>NDM<br>- | FRMR NR~=VS<br>NDM<br>j | I(VS-1,VR)<br>RSP<br>- |
| I NS=lastNS | FRMR NDM<br>NDM<br>- | RR(VR)<br>NRM<br>j | RR(VR)<br>NRM<br>g |
| I NS~=VR | FRMR NDM<br>NDM<br>- | FRMR NS~=VR<br>NDM<br>j | FRMR NS~=VR<br>NDM<br>j |
| I NR=VS<br>NS=VR<br>no inbuf | FRMR NDM<br>NDM<br>k | RNR(VR+1)<br>NRM<br>c | RNR(VR+1)<br>NRM<br>m |
| NSP | NSP<br>NDM<br>o | <br>NRM<br>o | <br>NDM<br>p |
| DISC | UA<br>NDM<br>- | UA<br>NDM<br>o | UA<br>NDM<br>p |
| RESET | -<br>NDM<br>e | -<br>NDM<br>e | -<br>NDM<br>e |
| TEST | TEST<br>NDM<br> | TEST<br>NRM<br> | TEST<br>RSP<br> |
| XID | XID<br>NDM<br>i | XID<br>NRM<br>i | XID<br>RSP<br>i |
| MAC errors | <br>NDM<br>h | <br>NDM<br>h | <br>NDM<br>h |

LAN Protocol Definition Rev. B    page 11    October 31, 1988    Joe Kubler

© 1989 Norand Corporation

ACTIONS:

| | |
|---|---|
| a | enqueue link reset indication, VR=0, VS=0 |
| b | VS=VS+1, save send buffer in case of retransmit |
| c | VR=VR+1, indicate I-frame received (enqueue data), release last send buffer, lastNS=NS |
| d | dequeue send indication, VS=VS+1, VR=VR+1, indicate I-frame received, save send buffer |
| e | reset secondary, clear buffer, etc. |
| f | release send buffer |
| g | release last send buffer, send done |
| h | enqueue MAC error |
| i | enqueue I-field configuration info because it could be used by other layers or operating system. |
| j | FRMR enqueue |
| k | release last received buffer |
| l | same as b, but indicate SEND done |
| m | same as c, but indicate SEND done |
| n | same as d, but indicate SEND done |
| o | llcdone, disconnect |
| p | free send buff, disconnect |
| q | release last received buffer, then action f |

3.4.10 Primary State Machines

The primary is composed of two main functions. These are as follows:

NSPpoll   This function will perform the NSP poll and indicate the success or failure of same.

pollfsm   This fsm will poll a secondary specified by p. It will indicate when data has been received from a secondary, or when an error has occured. These are indicated through a pollrsp queue.

The following data structures are needed by the primary:

pollrspq     a queue for pollfsm outputs.
active_list  a list of the active secondaries.
p            variable to pass to pollfsm indicating which secondary's data structure to use.
known_list   list of all known secondaries.
secondary    array of data structures (defined below) that maintain all information needed to manage each secondary.
buf_avail    indicates whether a frame buffer is available to receive into.

The secondary data structure must include:

status    NDM/NRM,RR/RNR, peers RNR status
sendq     queue of data to send to the secondary
recq      queue of data from the secondary. This may be one queue for all secondaries to NL
error     count of retries in transmissions to secondary
address   the secondary's address
VR        next expected NS
VS        next expected NR
state     the state for the pollfsm.

Some configuration parameters are expected. These are as follows:

start_count   Number of normal polls to perform before doing NSPpoll.
initial_known List of secondaries which are likely to be active. This is
              used to resolve worst case contention at the beginning. The
              known list grows dynamically for later contention resolution.
maxerr        Used by pollfsm to limit error recovery attempts.

3.4.10.1 Procedure for Polling

The procedure for polling is as follows:

```
init
   known_list=initial_known
   active_list=empty
   pollrspq=empty do forever
   execute NSPpoll
   if successful
      put secondary in active_list
      secondary.state=POLL
      secondary.status=NDM
   end
   for start_count
      select next secondary
         p=secondary
         if pollrspq=error
            process error
            remove secondary from active_list
            enqueue error to secondary.recq
         end
         if pollrspq=I-frame
            enqueue data to secondary.recq
         end
      end
   end
end
```

If the network layer has data to send, then it will be enqueued to the secondary's send
queue by the interface at the DLC/NETWORK layer.

Note that each secondary will be polled only once. If it has many I-frames to send, it
will not be polled continuously for those frames. This is how data flow control works.
All secondaries with data are guaranteed a turn to transmit.

3.4.10.2 NSPpoll

The algorithm is:

```
send NSP to using requested address.
receive
if(timeout) return false
else return true
```

LAN Protocol Definition Rev. B      page 13      October 31, 1988      Joe Kubler

3.4.10.4 POLLfsm

The following table describes the state machine for specific polling. The inputs come from the link (as in UA), interrupts (timeout) or are determined from the status of the secondary (accessed through the variable p. see 3.4.10 above). One special input is buf_avail which is true when input buffers are available to receive an I-field (especially I-frames) and is false when no buffer is available. The mechanism for determining this input is unspecified. The POLLfsm routine could do this before the state machine is executed.

The management of the secondary's RNR mode is not done by the fsm but by modifying the inputs to the fsm. When it is known that the secondary is in RNR mode, no sendq inputs will be indicated to the fsm. The management of the primary's RNR mode is similar. When no input buffer is available, a check is made to determine if the secondary has been sent an RNR already. If it has not, then the fsm gets an input of NRM & ~bufavail. Else it gets NRM & sendq.

POLLfsm State Table

| Inputs | POLL | ACTIVATE | RSP | XID | DISC | TEST |
|---|---|---|---|---|---|---|
| reset secondary | RESET POLL o | RESET POLL o | RESET POLL o | RESET POLL o | RESET POLL o | RESET POLL o |
| test secondary | TEST TEST h | error | error | error | error | error |
| disconnect secondary | DISC DISC h | error | error | error | error | error |
| MAC error | POLL n | error | error | error | error | error |
| NDM | SNRM ACTIVATE h | error | error | error | error | error |
| NRM ~buf_avail | RNR(VR) POLL h | error | error | error | error | |
| NRM buf_avail ~sendq | RR(VR) POLL h | error | error | error | error | error |
| NRM sendq | I(VS,VR) RSP a | error | error | error | error | error |
| timeout sendbuf error<max | error | error | I(VS-1,VR) RSP b | error | error | error |
| timeout sendbuf error>=max | error | error | POLL c | error | error | error |
| timeout ~sendbuf error<max | RR(VR) POLL b | SNRM ACTIVATE b | error | XID XID b | DISC DISC b | TEST TEST b |
| timeout ~sendbuf error<max | RNR(VR) POLL b | SNRM ACTIVATE b | error | XID XID b | DISC DISC b | TEST TEST b |

LAN Protocol Definition Rev. B     page 15     October 31, 1988     Joe Kubler

© 1989 Norand Corporation

POLLfsm State Table (cont)

| Inputs | POLL | ACTIVATE | RSP | XID | DISC | TEST |
|---|---|---|---|---|---|---|
| timeout ~sendbuf error>=max | POLL c | POLL c | error | POLL c | POLL c | POLL c |
| UA | POLL e | XID XID d | POLL e | POLL e | POLL c | POLL e |
| FRMR | POLL f | POLL f | POLL f | POLL f | POLL f | POLL f |
| XID | POLL e | POLL e | POLL e | POLL k | POLL e | POLL e |
| TEST | POLL e | POLL e | POLL e | POLL e | POLL e | POLL p |
| I NS=VR NR=VS | POLL g | POLL e | POLL g | POLL e | POLL e | POLL e |
| I NS~=VR | POLL i | POLL e | POLL i | POLL e | POLL e | POLL e |
| I NR~=VS | POLL j | POLL e | POLL j | POLL e | POLL e | POLL e |
| RR NR=VS | POLL q | POLL e | POLL l | POLL e | POLL e | POLL e |
| RR NR~=VS | POLL j | POLL e | POLL j | POLL e | POLL e | POLL e |
| RNR NR=VS | POLL m | POLL e | POLL r | POLL e | POLL e | POLL e |
| RNR NR~=VS | POLL j | POLL e | POLL j | POLL e | POLL e | POLL e |

LAN Protocol Definition Rev. B   page 16   October 31, 1988   Joe Kubler

ACTIONS:

| | |
|---|---|
| a | dequeue sendq into sendbuf (used for retransmitting at timeout), VS=VS+1, retry=0 |
| b | retry=retry+1 |
| c | enqueue disconnect to fsmrspq, p.status=DM |
| d | p.status=NRM, VS=VR=0 |
| e | enqueue protocol error (input and state) to pollrspq, p.status=DM |
| f | enqueue FRMR and reason to pollrspq, setus=DM |
| g | enqueue received to pollrspq, VR=VR+1 |
| h | retry=0 |
| i | enqueue invalid NS to pollrspq |
| j | enqueue invalid NR to pollrspq |
| k | p.status=RNR mode, enqueue i-field for configuration usage |
| l | free sendbuf, enqueue send ok to pollrspq, p.status=RR |
| m | p.status=RNR |
| n | enqueue MAC error to pollrspq |
| o | p.status=NDM, clear reset request |
| p | clear test request |
| q | p.status=RR mode |
| r | same as l, but p.status=RNR mode |

4.0 Network Layer

The network layer routes messages from the transport layer to a destination point in the network and routes messages from the DLC to the transport layer. The transport layer is unaware of how this routing takes place. It knows only names of destinations. The network layer translates network addresses to and from these names.

The network layer itself is connectionless. All destinations are assumed to be addressable if functional. The network layer also does not perform any store and forward operations from one link to the same link or another link.

The transport layer will request that a connection with a destination be made even though the network layer is connectionless. This request is needed to provide layer independance and provide for a routing mechanism from the network layer to the transport layer and vice versa without having to specify the destination name in every request. The connection request will open a virtual channel from the transport layer to the destination transport layer.

The transport layer can send connectionless packages also, these are known as mail, and delivery is not guaranteed or indicated.

4.1 Network Layer Packet Format

To provide for routing, each message must be incorporated with a header as follows:

<channel><message>  where:

channel    This value along with the link and link address used will uniquely identify the source and destination. When the message is received, it can be routed to the transport layer element that connected on the channel. The field is 16 bits wide. Channel 0 is reserved for the network layer.
    message    message from transport layer

4.2 Network Layer Interface

The interface to the network layer is composed of commands, responses and indicators as defined below.

4.2.1 Network Layer Commands

| Command | Usage |
|---|---|
| CONNECT | The transport layer passes a destination name, requested channel and queue for receive data. The network layer creates a channel entry for the destination by determining which link (DLC) and link address to use from a network ID table. If the requested channel is zero, then a channel number is generated. Otherwise if a channel table entry already exists for the requested channel, a different channel number is generated. The channel number is returned. A channel table entry is composed of the link, link address, and the requested channel, unless the requested channel was zero, in which case the channel number itself is used. |
| DISCONNECT | The transport layer passes a channel number to the network layer indicating that the channel is no longer required. |
| RESET | All channels are freed along with buffers etc. The network layer will reset each DLC. |
| CONFIG | The transport layer passes a network ID table to the network layer for use in connections. |
| SEND | The transport layer passes the channel and message to the network layer for creating packets. When messages are sent on the channel, the requested channel field of the channel table entry is used in the packet. |
| MAIL | The transport layer passes a destination ID and message to the network layer. |

Note that there is no RECEIVE command because the CONNECT command passes a queue to use for any receive.

4.2.2 Network Layer Responses

Some commands to the network layer return an immediate response. These are:

| Command | Response |
|---|---|
| CONNECT | The valid responses are CONNECT Acceptable, No Channel Available and Destination ID Unknown. Note that the CONNECT Done Indicator returns the channel number to use. |
| DISCONNECT | The responses are OK and No Such Channel. |
| CONFIG | The responses are Config Parms OK and Config Parms Invalid. |
| SEND | The responses are Parms OK, Invalid Channel and Message Too Long. |
| MAIL | The responses are Parms OK, Unknown Destination, and Message Too Long. |

4.2.3 Network Layer Indicators

Some of the commands have indicators of completion. These indicators allow the transport layer to issue a command, receive the response and then continue processing while the network layer executes the command.

| Command | Indicator |
|---|---|
| CONNECT | Used to return the channel number to use. In this implementation, the channel will be quickly determined because no actual communication will be performed. |
| DISCONNECT | In this implementation, no actual communication is done for a DISCONNECT, but to keep the interface compatible, a Done indicator is sent to the transport layer. |

LAN Protocol Definition Rev. B    page 18    October 31, 1988    Joe Kubler

```
RESET      Reset complete.
SEND       Sent to the transport layer when the DLC indicates it has
           finished sending or when it can't send because of an error
           condition.  Any error is in the indicator.
RECEIVE    There is no RECEIVE command, but as indicated in the CONNECT
           command, when data arrives for a channel it is queued for the
           transport layer with any error status.  (See the discussion on
           the MAC interface to the LLC for types of errors possible.
           Also see the discussion on the fsms for the DLC.).  Also, if a
           message is received that is on a non-existant channel, it will
           be passed to the transport layer and marked unknown.  The
           transport layer must provide a queue (or something) for such
           messages.
```

5.0 Transport Layer

The transport layer provides the following services to the session layer:

1. It will establish connections through the network layer.
2. When the transport layer receives on an unknown channel the message is passed uninterpreted with the source channel ID to the session layer.
3. It will segment large amounts of data into sizes acceptable by the network layer for transmission and combine received data back into their original size.  This is called chaining.
4. It will provide end to end communication services where multiple messages are communicated in one or both directions.
5. It is full duplex.

5.1 Transport Message Format

The format of messages between the communicating transport layers is:

<transport-hdr><message> where:

transport-hdr   header used by transport layer to help manage session.
                    (See next section.)
    message         message received or to be sent

5.2 Transport Header

To provide the transport services, a header is attached to each message to be sent.  The header is one byte and its format is as follows:

```
Bits 7 6 5 4 3 2 1 0
     | | | | | | | |
     | | | | | | +-+ Service Provided For
     | | | | | |      00      Transport Layer
     | | | | | |      01      Session Layer
     | | | | | |      10      Presentation Layer
     | | | | | |      11      Application Layer
     | | | | | +---- unused (set to 0)
     | | | | +------ Mail (1=Mail message)
     | | +-+-------- Chaining
     | |              00      Middle Of chain
     | |              01      End Of chain
     | |              10      First Of chain
     | |              11      Only Of chain
     | +------------ Response type (see below)
     +-------------- Message type (0=request,1=response)
```

LAN Protocol Definition Rev. B    page 19    October 31, 1988    Joe Kubler

5.2.1 Service Provided For Subfield

The Service Provided For field is used to indicate which layer is using the transport layer functions.

5.2.2 Chaining Subfield

The chaining bits indicate how the data is being segmented into smaller elements for transmitting and used by the receiving transport layer to recombine the data. The transport layer will guarantee delivery in the proper order. An Only Of chain indicates that the data did not get split into smaller pieces. A configuration parameter will specify how large a message can be before it must be split.

5.2.3 Response Type Subfield

Response Type is used in two ways: if the message type is a request then it indicates whether a response is required. If the message type is a response then it indicates whether the reponse is positive or negative. See the following table.

| Message Type | Response Type | Meaning |
|---|---|---|
| 0 | 0 | request, no response |
| 0 | 1 | request, response required |
| 1 | 0 | positive response |
| 1 | 1 | negative response |

A positive response indicates that the message was received by the destination. It may also mean that the message was processed if the destination delayed responding until after processing. A negative response will include a data field used to return the reason the message was not accepted by the destination.

Only the last in chain elements will be marked positive or negative response.

5.2.4 Message Type Subfield

Message Type indicates whether this is a response or a request.

5.2.5 Mail Subfield

The Mail subfield indicates that a mail message follows. Mail is connectionless, meaning that no session is required or created, nor is any response required or allowed. Only the session layer can use mail; applications cannot.

5.3 Transport Layer Interface

The interface to the transport layer is composed of commands, responses and indicators as defined below:

5.3.1 Transport Layer Commands

| Command | Usage |
|---|---|
| CONNECT | The session layer passes a destination name, requested channel and queue for receive data to the transport layer. The transport layer creates a connection entry for the destination by issuing a CONNECT request to the network layer. |
| DISCONNECT | The session layer passes a connection number to the transport layer indicating that the connection is no longer required. The transport layer will free the channels used for the connection. |
| RESET | All connections are freed along with buffers etc. The transport layer will reset the network layer. |
| CONFIG | Currently included only for layer compatibility. |

LAN Protocol Definition Rev. B        page 20        October 31, 1988        Joe Kubler SEND     The session layer passes the connection number, service provider
         ID, message type (request, positive response or negative response)
         and data to the transport layer. The service provider ID and
         message type are used to build the transport header. If the data
         is longer than that usable by the network layer, it is segmented
         using chaining.
MAIL     The session layer passes a destination ID and a message to the TL.
         This message is not guaranteed delivery and no indication of
         delivery is posted.

Note that there is no RECEIVE command because the CONNECT command passes a
queue to use for any receive data on the connection.

5.3.2 Transport Layer Responses

Some commands to the transport layer return an immediate response. They are:

| Command | Response |
| --- | --- |
| CONNECT | The valid responses are CONNECT Acceptable, No Connection Available and Destination ID Unknown. Note that an indicator returns the connection number to use. |
| DISCONNECT | The responses are Valid and No Such Connection. |
| CONFIG | The responses are Config Parms OK and Config Parms Invalid. |
| SEND | The responses are Parms OK and Connection Number Invalid. |
| MAIL | The responses are Parms OK, Destination Unknown and Message Too Long. |

5.3.3 Transport Layer Indicators

Some of the commands have indicators of completion. These indicators can allow the
session layer to issue a command, receive the response and then go and process something
else while the transport layer executes the command.

| Command | Indicator |
| --- | --- |
| CONNECT | Used to return the connection number to use. |
| DISCONNECT | A Dne indicator is sent to the session layer. |
| RESET | Reset completed. |
| SEND | Status is sent to the session layer when the network layer indicates it has finished sending or when it can't send because of an error condition. Any error is in the indicator. Requests marked as response required will not indicate completion until a positive or negative response is received. |
| RECEIVE | There is no RECEIVE command, but as indicated in the CONNECT command when data arrives for the connection it is queued for the session layer with a status indicating errors. (See the errors returned by the network layer). If messages are received marked as unknown (channel) by the network layer, they are passed to the session layer, also marked unknown. |

5.4 Transport Layer Operation

The transport layer operates as follows:

1. If a message arrives marked unknown it is passed to the session layer as
   is (this will include the channel number).
2. When a CONNECT command is received from the session layer, the transport
   layer will issue a CONNECT command to the network layer. The channel
   number is then kept in a table relating it to the connection number used
   by the session layer. This will allow the transport layer to provide
   support for each session independently.

LAN Protocol Definition Rev. B    page 21    October 31, 1988    Joe Kubler

3. A DISCONNECT command causes the transport layer to issue a disconnect to the network layer.
4. Messages are processed for chaining before sending and upon reception.
5. A request message that is sent and marked as requiring a response will cause the transport layer to hold up an indication of completion until the response arrives.
6. A request message that is received and marked as requiring a response will cause the transport layer to accept only a response message from the session layer. Any other message is an error. The transport layer will send a -rsp on the connection if a second request arrives for the same layer when the first request was marked as a positive response request. The message value for this response is FF00H.
7. A receive request that has a chaining sequence error (ie. last in chain before first in chain) will cause the TL to send a negative response of FF01H.
8. Currently it is assumed that buffer space is available for receiving. Therefore no dataflow control is implemented in the transport layer.

6.0 Session Layer

The session layer provides the mechanism for establishing communication with a process in the destination. This communication is called a session. Commands are sent between session layers that provide information needed to establish connections through the transport layer for each session required.

6.1 Session to Session Messages

The messages sent between session layers that are used to establish the session are defined in this section. These messages mark the service provider as the session layer.

6.1.1 BIND

The BIND command is used to establish a session. It includes information about the requester (ie. application requesting the session) and the process or application name to start the session with. Also needed is the name of the device in which the application is located. This is needed to establish the connection. This message is sent requesting a response.

The format of the BIND is as follows:

<BIND><source-id><source name><dest-id><BIND-id><options> where:

| | |
|---|---|
| BIND | 00H |
| source-ID | An ASCII field specifying the application requesting the session. This field is terminated by an ASCII null character. |
| source name | An ASCII field specifying the name of the source device as known by the network. It is terminated with an ASCII null. |
| dest-ID | An ASCII field specifying the application the session is requested with. This field is terminated by an ASCII null. |
| BIND-ID | Two bytes. The session ID number that will be used on this end of the session. This field is needed by the BIND response. |
| options | Currently must be a byte of zeros. |

The BIND expects a response from the destination session layer. If the response is negative, a reason is expected. (See the next section for the format of the response.)

LAN Protocol Definition Rev. B    page 22    October 31, 1988    Joe Kubler

6.1.2 BIND Response

When this message is received, the session layer will check if a BIND was sent and is still pending. If not a TERM-SESS is sent indicating that no session can be established. Otherwise a session ID is returned to higher layers to use for the new session. This response is a transport layer type response.

The BIND response format follows:

<BIND><BIND-id><response> where:

```
BIND       00H
BIND-ID    Two bytes.  The same as the ID sent by the BIND command.  This
           is needed to identify which BIND command this relates to.  There
           can be many outstanding at one time.
response   value    meaning (one byte)
           0        BIND accepted, session established
           1        BIND rejected, application unknown
           2        BIND rejected, too many sessions in destination.
```

6.1.3 UNBIND

UNBIND is sent on the connection for the session indicating that the session is over and giving a reason for the termination. The structure of UNBIND follows:

<UNBIND><reason> where:

```
UNBIND     01H
reason     This is an application specific reason code two bytes in length.
```

UNBIND is sent on the session connection and a negative response UNBIND is not allowed. The response should have only one byte, the UNBIND command code. This response should not be sent by the session partner until all the previously sent requests have been read. This allows sessions that are not using +responses on the requests to guarantee that all session data has been processed.

It is possible that the session partner simultaneously issued an UNBIND. In that case, no response to this UNBIND will be received, no response to the session partner's UNBIND is sent and the session is unbound.

6.1.4 TERM-SESS

The TERM-SESS message is used for abnormal ending of sessions. It originates from outside the session partners and no response is allowed. Its format follows:

<TERM-SESS><reason> where:

```
TERM-SESS  02H
reason     value  meaning (one byte)
           0      session partner was terminated (abend).
           1      session layer was reset (by higher layer)
           2      session layer was reset (by LLC reset command)
           3      process issuing BIND has terminated request.  No session possible.
```

LAN Protocol Definition Rev. B      page 23      October 31,1988      Joe Kubler

6.2 Session Layer Interface

The session layer interface to higher layers consists of commands, responses and indicators. The commands will provide for timeouts. This means that commands that receive good responses will have a maximum lifetime as specified by the presentation layer in the OPEN and LISTEN commands. A timeout of zero is legal and implies no timeout.

6.2.1 Session Layer Commands

| Command | Usage |
|---|---|
| START | This command specifies a system resource that a session is requested with. The name of the requesting process is also a parameter. The session layer will try to BIND a session with the system resource. The resource is converted into a destination name for the transport connect command and a dest-ID for the BIND message. |
| LISTEN | This command specifies the requesting process's name. It informs the session layer of the willingness of the process to accept a BIND message from another process. The BIND message should be marked as an unknown connection by the transport layer, and the connection number and destination name (from the BIND) will be used to create a connection with the transport layer. This command will not timeout until a BIND is received. After the BIND is received, the timeout timer will begin. |
| TERM | This command specifies a process that has abended and requires a session to be terminated. The session layer must look through its session table to find the session and send a TERM-SESS command to the partner of the session that was terminated. |
| RESET | All the sessions are terminated. |
| END SESSION | This command indicates that a process wants to end a session. |
| CONFIG | The system resource table is changed to that passed to the session layer. The resource table is used to translate system resources into destination names and dest-IDs for the start command. |
| SEND | This command takes the data passed and sends it on the connection specified by the session ID. |
| RECEIVE | This command indicates that the local session is awaiting data from its partner. |
| CANCEL | This command will cancel a request for a session, either a START or a LISTEN session. The parameters are type (start,listen), the requesting process name and if the type is start, the system resource that the session was intended for. |

6.2.2 Session Layer Responses

The session layer will immediately respond to some of the commands issued to it. These responses are indicated below.

| Command | Response |
|---|---|
| START | Response is good if number of sessions is less than the maximum allowed and the resource exists. |
| LISTEN | Same as start. |
| END SESSION | Response is good if session exists, bad otherwise. |
| TERMINATE | Response is good if session exists, bad otherwise. |
| CONFIG | Response is good if system resource table is valid. |
| SEND | Response is good if session exists, bad otherwise. |
| RECEIVE | Same as send. |
| CANCEL | Response is good if session can be cancelled. This is true if the session has not actually been started yet. |

LAN Protocol Definition Rev. B    page 24    October 31, 1988    Joe Kubler

6.2.3 Session Layer Indicators

Certain session layer commands from higher layers eventually return indicators. This allows the higher layers to issue a command, verify the response and then continue processing until the session layer completes the command. The indicators are defined below.

| Command | Indicator |
|---|---|
| START | Session is established and a session ID is returned or it could not be established. Failure to establish a session can occur if the destination cannot start a session with dest-ID or if it has too many sessions already. It can also happen if communications at a lower layer break down. |
| LISTEN | Session is established. The session ID and the session partner ID (from the BIND command) is returned. |
| RESET | The session layer has been reset and all sessions have been terminated. |
| END SESSION | The session has been ended normally. The response to the UNBIND was received or an UNBIND was received from the session partner with a reason code that is passed up. |
| TERM | A session has been terminated abnormally with a TERM-SESS message. The reason is passed up. |
| SEND | The send is done. Status is returned indicating success or failure and why. |
| RECEIVE | Data has been received from the partner or the partner has been terminated or is UNBINDing. Any error status is included (see transport layer receive indicator). Note that if no pending RECEIVE command has been received by the session layer, the data will be buffered if possible. |

7.0 Other Layers

The presentation layer and the application layer are considered by this document to be the province of the operating system and will not be defined here. Some things that should be addressed by these layers are file transfer protocols, printer protocols, and terminal protocols. These layers can shield the application programmer from the intricacies of file transfer, terminal control and printer control.

8.0 Sample Sessions

This section has examples of session establishment, usage and termination. Each example will detail the command, response and indicator flow through the layers.

8.1 Session Establishment

Two examples of session establishment are given: the first uses the START SESSION command and the second uses the LISTEN command.

8.1.1 Start Session

The session layer receives a START (local process, remote process) command. It looks up the destination name and dest-ID in the resource table. A session establishment table entry is made relating a session ID with the local process, remote name, and dest-ID. A connection is established, passing zero as the requested channel. A BIND(local process, local name, dest-ID, session ID, 0) is sent. When the response to the BIND is received, the session layer looks up the response's session ID in the session establishment table to find which session is being established and returns an indicator of session established.

The network layer will issue a CONNECT to the network layer using the remote name and return that channel number as the connection number. The numbers will be kept in a connection table along with the state of the connection (ie. waiting for response, etc)

and specified queue. The transport layer will send the BIND on that channel. The BIND response will be passed to the session layer on the queue for the connection.

The network layer will process the CONNECT command by assigning a channel number that is unused and creating a channel entry composed of the destination link, link address and channel number. When the BIND is sent, the channel is looked up. The requested channel number in the entry will be used in the packet. When the BIND RSP is received, the network layer will check the specified channel number and find the requested channel, the link and link address should match establishing the channel to pass the data on. If the request did not match, the network layer would be forced to search for the match. This would never occur when the message received was a response to a BIND because the channel number would have been requested by this side of the session.

8.1.2 Listen Session

The session layer is issued a LISTEN (local process, remote process) or a LISTEN (local process,"*"), where "*" indicates any remote process. When a BIND(remote process,remote name, local process, rem sess ID, 0) is received, the session layer will get the message marked as 'unknown' connection. It will identify that the local process is awaiting a session and will issue a CONNECT to the transport layer for the remote name and channel (the one that was marked unknown by the transport layer). A BIND response is sent and the session ID is then returned along with the remote process and remote name fields from the BIND. If no local process existed to BIND with, a TERM-SESS is mailed indicating a BIND REJECT, APPLICATION UNKNOWN.

The transport layer will receive on an unknown channel the BIND request and pass it to the session layer. It will then process the CONNECT command from the session layer passing the requested channel to the network layer along with the destination and a queue. In this case the requested channel will be non-zero. The channel number from the CONNECT is used in the connection table and returned to the session layer. The BIND response will then be processed.

The network layer will receive the BIND command and pass it to the transport layer marked 'unknown' because no channel exists for that message. It will then process the CONNECT for the remote name to create a channel. Since the requested channel field is non-zero, the network layer will try to use that channel. If it could not, another channel would be established and the link, link address and requested channel number would be saved along with the queue. The channel number is then returned. The BIND response will be sent on this channel.

8.2 Normal Session Data Transfer

After a session has been started, a SEND request including the service provided for and response indicators are passed to the session layer. The session layer determines that the session ID is valid and passes the data parameters to the transport layer via a send command. It will then wait for the indicator that the SEND is done. If the message asked for a response, this will not occur until the response is received by the transport layer. The session layer can process other sessions while waiting.

The transport layer will determine if the data needs to be split into a chain, and if so send multiple chain elements to the network layer. If a response was required, it will 'wait' for the response on that connection. Again, the wait simply means that other connections can be processed. When the response arrives, the SEND COMPLETION INDICATOR is issued to the session layer, along with the response being written to the queue for the connection. In order to perform these functions, the transport layer will look up the connection number to determine the channel to use. It will also use the channel from in received messages to determine which connection to enqueue the message to.

The network layer will take the channel number on transmit data and look up the link, link address and channel number expected by the destination. It will send the message after adding the requested channel number from the channel table entry. On received data it searches the channel table for a match to the link, link address and requested channel and sends the data on the queue from the matching entry.

8.3 Normal Session Termination

A session is terminated normally when the session layer receives an END SESSION request for a valid session ID. The session layer will send an UNBIND request with the reason specified by the END SESSION command. A SEND command issued to the transport layer will indicate that a response is required. Once the response is received, the transport connection is disconnected.

8.4 Abnormal Session Termination

The operating system will issue a TERMINATE command to the session layer indicating the local process. The session layer will look up the local process name in the session table and find the connection to send the TERM-SESS message on. It will send the message and then issue a DISCONNECT command to the transport layer.

I claim as my invention:

1. A vehicle data system for a user manned transport vehicle, said vehicle data system comprising:
   a) vehicle electric power means for supplying electric power for effecting data transmission during mobile use of such transport vehicle;
   b) vehicle network means powered at least in part by said vehicle electric power means for conveying data in such transport vehicle;
   c) portable data device means for data collection operation, said portable data device means having first and second ends, a first longitudinal axis intersecting and defining a first dimension between said first and second ends, an exterior surface, and first fixed contact means mounted on said exterior surface at said first end;
   d) mobile mount adapter means defining a receptacle having an open top through which said portable data device means enters and exits said receptacle, a closed bottom, a second longitudinal axis intersecting and defining a second dimension between said open top and said closed bottom;
   e) said receptacle having connection means coupled with said vehicle network means and arranged to removably receive said portable data device means in a connected position wherein data is interchanged via the vehicle network means and said first and second longitudinal axes are disposed in a parallel relationship with each other, said connection means comprises second contact means mounted on said closed bottom to engage said first contact means when said portable data device means is disposed within said receptacle in said connected position;
   f) said mobile mount adapter means securely and frictionally retaining said portable data device means in said connected position during mobile use of the user manned transport vehicle and providing for quick removal of said portable data device means from said connected position for portable use;
   g) said portable data device means having a frontal side with user interlace means thereat for use in a generally upright orientation, said frontal side having lateral margins at respective lateral boundaries of said user interface means which lateral margins are covered without obstructing said user interface means when said portable data device means is disposed in said connected position;
   h) said receptacle having a slotted frontal wall means for defining a frontal opening which renders accessible to the user a portion of said user interface means adjacent said second end when said portable data device means is disposed in said receptacle in said connected position; and
   i) said first dimension being greater than said second dimension whereby when said portable data device means is disposed within said receptacle in said connected position, an exposed portion of said portable data device means is unobstructed by said mobile mount adapter means to facilitate the user to grasp said exposed portion and to quickly remove said portable data device means from said connected position in said receptacle along a path parallel to said second longitudinal axis.

2. A vehicle data system as claimed in claim 1, wherein said mobile mount adapter means comprises means for releasably retaining said portable data device means within said receptacle in said connected position during the mobile use of the vehicle and for providing quick removal of said portable data device means from said receptacle for portable use remote from the vehicle.

3. A vehicle data system as claimed in claim 1, wherein said second contact means engages said first fixed contact means without penetrating said portable device means.

4. The vehicle data system as claimed in claim 1, wherein each of said second contact means and said first fixed contact means comprises a substantially flat surface, said flat surfaces of said first fixed contact means and said second contact means merely abutting each other when said portable device is disposed to said connected position within said mobile mount adapter means.

5. The vehicle data system as claimed in claim 1, wherein each of said second contact means and said first fixed contact means has an abutting surface of like configuration, said abutting surfaces engaging each other when said portable device means is disposed to said connected position within said mobile mount adapter means.

6. The vehicle data system as claimed in claim 5, wherein each of said abutting surfaces is relatively flat thus permitting quick engagement therebetween and the quick receiving and withdrawal of said portable device means into and from said mobile mount adapter means.

7. A vehicle data system as claimed in claim 1, wherein said second contact means is mounted on said bottom end to spring bias said second contact means into engagement with said first fixed contact means.

8. A data communication system for use in data collection operations, said data communication system comprising:
   a) data path means for conveying data;
   b) portable data device means for data collection operation, said portable data device means having first and second ends, a first longitudinal axis intersecting and defining a first dimension between said first and second ends, an exterior surface, and first contact means mounted on said exterior surface at said first end;
   c) mount adapter means defining a receptacle having an open top through which said portable data device means enters and exits said receptacle, a closed bottom, and a second longitudinal axis intersecting and defining a second dimension between said open top and said closed bottom; and
   d) connection means coupled with said data path means and arranged to removably receive said portable data device means in a connected position wherein data is interchanged with said data path means and said first and second longitudinal axes are disposed in a parallel relationship with each other, said connection means comprises said first contact means and second contact means, said second contact means being mounted upon said closed bottom to engage said first contact means when said portable data device means is disposed within said receptacle in said connected position;
   e) said mount adapter means comprising means for engaging and retaining said portable data device means in said connected position as said portable data device means is transported through said open top and to said connected position;
   f) said first dimension being greater than said second dimension whereby when said portable data device means is disposed within said receptacle in said connected position, said receptacle receives an engaged portion of said portable data device means proximate to said first contact means and defines an exposed portion of said portable data device means which is unobstructed by said mount adapter means to facilitate the user to grasp said exposed portion and to quickly remove said portable data device means from said receptacle along a path parallel to said second longitudinal axis.

9. A data communication system as claimed in claim 8, wherein said portable data device means has a front side for supporting user interface means thereon, said receptacle having an opening therein to permit user access therethrough to said user interface means when said portable data device means is disposed to said connected position.

10. A data communication system as claimed in claim 9, wherein said mount adapter means defines an unobstructed passage in communication with said receptacle for the transport of said portable data device means to and from said receptacle, said unobstructed passage enclosing said second longitudinal axis.

11. A data communication system for use in data collection operations, said data communication system comprising:

a) data path means for conveying data;

b) portable data device means for data collection operation, said portable data device means comprising first and second ends, a linear longitudinal axis intersecting said first and second ends, and first contact means mounted on said first end;

c) mount adapter means defining a receptacle having an open top through which said portable data device means is transported into and from said receptacle, a bottom end, second contact means coupled to said data path means and mounted on said bottom end for engaging said first contact means when said portable data device means is transported into said receptacle and to a data exchange position, and means for engaging and retaining said portable data device means in said data exchange position as said portable data device means is transported to said data exchange position; and d) said mount adapter means defining an unobstructed passage in communication with said receptacle for the quick transport of said portable data device means along said passage into and from said receptacle, said passage enclosing said longitudinal axis when said portable data device means is retained by said retaining and engaging means in said data exchange position.

12. A data communication system for data collection operation, said data communication system comprising:

a) portable data device means for data collection operation, said data device means comprising first and second ends, and first contact means mounted on said first end; and b) mount adapter means defining a receptacle having an open top through which said portable data device means is transported into and from said receptacle, a bottom end, a longitudinal axis intersecting said open end and said closed end, second contact means mounted on said bottom end for contacting said first contact means when said portable data device means is disposed within said receptacle in a data exchange position, said mount adapter means defining an unobstructed passage opening in communication with said receptacle for the quick transport of said portable data device means along said passage and into and from said receptacle, said unobstructed passage enclosing said longitudinal axis when said portable data device means is disposed in its data exchange position.

13. The data communication system as claimed in claim 12, wherein said second contact means engages said first contact means without penetrating said portable device means.

14. The data communication system as claimed in claim 12, wherein each of said second contact means and said first contact means comprises a substantially flat surface, said flat surfaces of said first contact means and said second contact means merely abutting each other when said portable device is disposed to said connected position within said mobile mount adapter means.

15. The data communication system as claimed in claim 12, wherein each of said second contact means and said first contact means has an abutting surface of like configuration, said abutting surfaces engaging each other when said portable device means is disposed to said connected position within said mobile mount adapter means.

16. The data communication system as claimed in claim 15, wherein each of said abutting surfaces is relatively flat thus permitting quick engagement therebetween and the quick receiving and withdrawal of said portable device means into and from said mobile mount adapter means.

17. A communication system as claimed in claim 12, wherein said second contact means is mounted on said bottom end to spring bias said second contact means into engagement with said first contact means.

18. A data communication system for data collection operation, said data communication system comprising:

a) portable data device means for data collection operation, said data device means comprising first and second ends, and first contact means mounted on said first end, said contact means comprising a plurality of fixed contacts disposed in a linear array;

b) mount adapter means defining a receptacle having an open top through which said portable data device means is transported into and from said receptacle, a bottom end, a longitudinal axis intersecting said open end and said closed end, second contact means mounted on said bottom end for contacting said first contact means when said portable data device means is disposed within said receptacle in a data exchange position, said mount adapter means defining an unobstructed passage opening in communication with said receptacle for the quick transport of said portable data device means along said passage and into and from said receptacle; and c) said second contact means comprising a plurality of contact fingers, each contact finger having a free first end, a contact portion and a second end fixedly mounted to spring bias its contact portion into electrical contact with a corresponding one of said plurality of fixed contacts, said plurality of contact fingers being aligned parallel of each other and arranged such that said contact portions thereof are aligned to mate with corresponding ones of said fixed contacts when said portable data device means is disposed within said receptacle in said data exchange position.

19. The data communication system as claimed in claim 18, wherein each of said plurality of contact fingers comprises an arm extending between said first free end and said contact portion, and wherein said contact portion comprises a U-shaped member.

20. The data communication system as claimed in claim 19, wherein said plurality of contact fingers is mounted on a support member made of an insulating material, said second end fixedly mounted on said support member.

21. The data communication system as claimed in claim 20, wherein said support member comprises a plurality of dividing members, each dividing member being disposed between adjacent contact fingers.

22. The data communication system as claimed in claim 20, wherein each contact finger comprises a second arm connected to said second fixed end and extending essentially parallel to said first mentioned arm when in its undeflected position, said second arm having a distal portion extending free of said support member to facilitate ready electrical contact thereto.

23. A vehicle data system for a user manned transport vehicle, said vehicle data system comprising:

a) a vehicle power system for supplying electric power for effecting data transmission during mobile use of such transport vehicle;

b) a vehicle network powered at least in part by said vehicle power system for conveying data in such transport vehicle;

c) a portable data device capable of data collection, said portable data device having first and second ends, a first longitudinal axis intersecting and defining a first dimension between said first and second ends, an exterior surface, and a first fixed contact mounted on said exterior surface at said first end;

d) a mobile mount unit defining a receptacle having an open top through which said portable data device enters and exits said receptacle, a closed bottom, a second longitudinal axis intersecting and defining a second dimension between said open top and said closed bottom;

e) said receptacle having a connection system coupled with said vehicle network and arranged to removably receive said portable data device in a connected position wherein data is interchanged via the vehicle network and said first and second longitudinal axes are disposed in a parallel relationship with each other, said connection system comprising a second contact mounted on said closed bottom to engage said first contact when said portable data device is disposed within said receptacle in said connected position;

f) said mobile mount unit securely and frictionally retaining said portable data device in said connected position during mobile use of the transport vehicle and providing for quick removal of said portable data device from said connected position for portable use;

g) said portable data device having a frontal side with a user interface thereat for use in a generally upright orientation, said frontal side having lateral margins at respective lateral boundaries of said user interface, which lateral margins are covered without obstructing said user interface when said portable data device is disposed in said connected position;

h) said receptacle having a slotted frontal wall for defining a frontal opening which renders accessible to the user a portion of said user interface adjacent said second end when said portable data device is disposed in said receptacle in said connected position; and i) said first dimension being greater than said second dimension whereby when said portable data device is disposed within said receptacle in said connected position, an exposed portion of said portable data device is unobstructed by said mobile mount unit to facilitate the user to grasp said exposed portion and to quickly remove said portable data device from said connected position in said receptacle along a path parallel to said second longitudinal axis.

24. A vehicle data system as claimed in claim 23, wherein said mobile mount unit comprises means for releasably retaining said portable data device within said receptacle in said connected position during the mobile use of the vehicle and for providing quick removal of said portable data device from said receptacle for portable use remote from the vehicle.

25. A vehicle data system as claimed in claim 23, wherein said second contact engages said first fixed contact without penetrating said portable data device.

26. A vehicle data system as claimed in claim 23, wherein each of said second contact and said first fixed contact comprises a substantially flat surface, said flat surfaces of said first fixed contact and said second contact merely abutting each other when said portable data device is disposed to said connected position within said mobile mount unit.

27. A vehicle data system as claimed in claim 23, wherein each of said second contact and said first fixed contact has an abutting surface of like configuration, said abutting surfaces engaging each other when said portable data device is disposed to said connected position within said mobile mount unit.

28. A vehicle data system as claimed in claim 27, wherein each of said abutting surfaces is relatively flat thus permitting quick engagement therebetween and the quick receiving and withdrawal of said portable data device into and from said mobile mount unit.

29. A vehicle data system as claimed in claim 23, wherein said second contact is mounted on said bottom end to spring bias said second contact into engagement with said first fixed contact.

30. A data communication system for use in data collection operations, said data communication system comprising:

a) a data path capable of conveying data;

b) a portable data device capable of data collection, said portable data device having first and second ends, a first longitudinal axis intersecting and defining a first dimension between said first and second ends, an exterior surface, and a first contact mounted on said exterior surface at said first end;

c) a mount unit defining a receptacle having an open top through which said portable data device enters and exits said receptacle, a closed bottom, and a second longitudinal axis intersecting and defining a second dimension between said open top and said closed bottom; and d) a connection system coupled with said data path and arranged to removably receive said portable data device in a connected position wherein data is interchanged with said data path and said first and second longitudinal axes are disposed in a parallel relationship with each other, said connection system comprising said first contact and a second contact, said second contact being mounted upon said closed bottom to engage said first contact when said portable data device is disposed within said receptacle in said connected position;

e) said mount unit being capable of engaging and retaining said portable data device in said connected position as said portable data device is transported through said open top and to said connected position;

f) said first dimension being greater than said second dimension whereby, when said portable data device is disposed within said receptacle in said connected position, said receptacle receives an engaged portion of said portable data device proximate to said first contact and defines an exposed portion of said portable data device which is unobstructed by said mount unit to facilitate the user to grasp said exposed portion and to quickly remove said portable data device from said receptacle along a path parallel to said second longitudinal axis.

31. A data communication system as claimed in claim 30, wherein said portable data device has a front side capable of supporting a user interface thereon, said receptacle having an opening therein to permit user access therethrough to said user interface when said portable data device is disposed to said connected position.

32. A data communication system as claimed in claim 31, wherein said mount unit defines an unobstructed passage in communication with said receptacle to transport said portable data device to and from said receptacle, said unobstructed passage enclosing said second longitudinal axis.

33. A data communication system for use in data collection operations, said data communication system comprising:
   a) a data path capable of conveying data;
   b) a portable data device capable of data collection, said portable data device comprising first and second ends, a linear longitudinal axis intersecting said first and second ends, and a first contact mounted on said first end;
   c) a mount unit defining a receptacle having an open top through which said portable data device is transported into and from said receptacle, a bottom end, a second contact coupled to said data path and mounted on said bottom end for engaging said first contact when said portable data device is transported into said receptacle and to a data exchange position, and said mount unit being capable of engaging and retaining said portable data device in said data exchange position as said portable data device is transported to said data exchange position; and
   d) said mount unit defining an unobstructed passage in communication with said receptacle for the quick transport of said portable data device along said passage into and from said receptacle, said passage enclosing said longitudinal axis when said portable data device is retained in said data exchange position.

34. A data communication system for data collection operation, said data communication system comprising:
   a) portable data device capable of data collection, said data device comprising first and second ends, and a first contact mounted on said first end; and
   b) a mobile mount unit defining a receptacle having an open top through which said portable data device is transported into and from said receptacle, a bottom end, a longitudinal axis intersecting said open end and said closed end, a second contact mounted on said bottom end for contacting said first contact when said portable data device is disposed within said receptacle in a data exchange position, said mobile mount unit defining an unobstructed passage opening in communication with said receptacle for the quick transport of said portable data device along said passage and into and from said receptacle, said unobstructed passage enclosing said longitudinal axis when said portable data device is disposed in its data exchange position.

35. A data communication system as claimed in claim 34, wherein said second contact engages said first contact without penetrating said portable data device.

36. A data communication system as claimed in claim 34, wherein each of said second contact and said first contact comprises a substantially flat surface, said flat surfaces of said first contact and said second contact merely abutting each other when said portable data device is disposed to said connected position within said mount adapter unit.

37. A data communication system as claimed in claim 34, wherein each of said second contact and said first contact has an abutting surface of like configuration, said abutting surfaces engaging each other when said portable data device is disposed to said connected position within said mount adapter unit.

38. A data communication system as claimed in claim 37, wherein each of said abutting surfaces is relatively flat thus permitting quick engagement therebetween and the quick receiving and withdrawal of said portable data device into and from said mount adapter unit.

39. A communication system as claimed in claim 34, wherein said second contact is mounted on said bottom end to spring bias said second contact into engagement with said first contact.

40. A data communication system for data collection operation, said data communication system comprising:
   a) a portable data device capable of data collection, said data device comprising a first end, a second end, and a first contact mounted on said first end, and said first contact comprising a plurality of fixed contacts disposed in a linear array;
   b) a mount adapter unit defining a receptacle having an open top through which said portable data device is transported into and from said receptacle, a bottom end, a longitudinal axis intersecting said open end and said closed end, a second contact mounted on said bottom end for contacting said first contact when said portable data device is disposed within said receptacle in a data exchange position, said mount adapter unit defining an unobstructed passage opening in said receptacle for the quick transport of said portable data device along said passage and into and from said receptacle; and
   c) said second contact comprising a plurality of contact fingers, each contact finger having a free first end, a contact portion and a second end fixedly mounted to spring bias its contact portion into electrical contact with a corresponding one of said plurality of fixed contacts, said plurality of contact fingers being aligned parallel of each other and arranged such that said contact portions thereof are aligned to mate with corresponding ones of said fixed contacts when said portable data device is disposed within said receptacle in said data exchange position.

41. A data communication system as claimed in claim 40, wherein each of said plurality of contact fingers comprises an arm extending between said first free end and said contact portion, and wherein said contact portion comprises a U-shaped member.

42. A data communication system as claimed in claim 41, wherein said plurality of contact fingers is mounted on a support member made of an insulating material, said second end fixedly mounted on said support member.

43. A data communication system as claimed in claim 42, wherein said support member comprises a plurality of dividing members, each dividing member being disposed between adjacent contact fingers.

44. A data communication system as claimed in claim 42, wherein each contact finger comprises a second arm connected to said second fixed end and extending essentially parallel to said first mentioned arm when in its undeflected position, said second arm having a distal portion extending free of said support member to facilitate ready electrical contact thereto.

* * * * *